(12) United States Patent
Shinkawa et al.

(10) Patent No.: US 10,901,220 B2
(45) Date of Patent: Jan. 26, 2021

(54) MOVABLE DEVICE, IMAGE PROJECTION APPARATUS, HEADS-UP DISPLAY, LASER HEADLAMP, HEAD-MOUNTED DISPLAY, OBJECT RECOGNITION DEVICE, AND VEHICLE

(71) Applicants: Mizuki Shinkawa, Kanagawa (JP); Tsuyoshi Hashiguchi, Kanagawa (JP); Goichi Akanuma, Kanagawa (JP)

(72) Inventors: Mizuki Shinkawa, Kanagawa (JP); Tsuyoshi Hashiguchi, Kanagawa (JP); Goichi Akanuma, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/441,641

(22) Filed: Jun. 14, 2019

(65) Prior Publication Data

US 2019/0391394 A1     Dec. 26, 2019

(30) Foreign Application Priority Data

Jun. 25, 2018   (JP) ................................. 2018-120205

(51) Int. Cl.
*G02B 27/01* (2006.01)
*G02B 27/09* (2006.01)
*G06K 9/32* (2006.01)

(52) U.S. Cl.
CPC ..... *G02B 27/0172* (2013.01); *G02B 27/0101* (2013.01); *G02B 27/0977* (2013.01); *G06K 9/3241* (2013.01)

(58) Field of Classification Search
CPC ............ G01N 33/6845; G02B 27/0101; G02B 27/0172; G02B 27/0977; G06K 9/00671; G06K 9/00805; G06K 9/3241; G16B 20/00; G16B 30/00; G16B 40/00
See application file for complete search history.

(56) References Cited

U.S. PATENT DOCUMENTS

| | | | |
|---|---|---|---|
| 6,177,667 B1 | 1/2001 | Fujita et al. | |
| 2007/0127111 A1 | 6/2007 | Hashiguchi et al. | |
| 2010/0014073 A1 | 1/2010 | Hashiguchi et al. | |
| 2010/0033685 A1 | 2/2010 | Seo et al. | |
| 2010/0195180 A1 | 8/2010 | Akanuma et al. | |
| 2010/0309536 A1 | 12/2010 | Akanuma et al. | |
| 2011/0063705 A1 | 3/2011 | Tsukamoto et al. | |
| 2011/0069367 A1 | 3/2011 | Sakai et al. | |
| 2012/0120470 A1 | 5/2012 | Kitazawa et al. | |
| 2015/0062683 A1 | 3/2015 | Akanuma et al. | |
| 2015/0077823 A1 | 3/2015 | Hashiguchi et al. | |
| 2015/0103404 A1* | 4/2015 | Rudy ................ | H01S 5/320275 359/567 |

(Continued)

FOREIGN PATENT DOCUMENTS

| | | |
|---|---|---|
| JP | 2016-009050 | 1/2016 |
| JP | 2016-081037 | 5/2016 |
| JP | 2016-102812 | 6/2016 |

*Primary Examiner* — Chun-Nan Lin
(74) *Attorney, Agent, or Firm* — IPUSA, PLLC

(57) ABSTRACT

A movable device includes a reflector; a movable section including the reflector; a first drive section connected to the movable section, the first drive section configured to drive the movable section; a first support connected to the first drive section to support the first drive section; and two adjusters disposed symmetrically with respect to the reflector.

22 Claims, 17 Drawing Sheets

(56) References Cited

U.S. PATENT DOCUMENTS

| | | | |
|---|---|---|---|
| 2016/0109697 A1* | 4/2016 | Nakagawa | G02B 26/101 |
| | | | 348/750 |
| 2016/0139404 A1 | 5/2016 | Akanuma | |
| 2016/0139408 A1* | 5/2016 | Yagi | G02B 27/0101 |
| | | | 359/633 |
| 2017/0176743 A1* | 6/2017 | Kitazawa | G02B 26/105 |
| 2017/0214891 A1* | 7/2017 | Tsukamoto | G02B 26/0858 |
| 2017/0269352 A1 | 9/2017 | Hashiguchi et al. | |
| 2017/0269354 A1 | 9/2017 | Suzuki et al. | |
| 2018/0084232 A1* | 3/2018 | Belenkii | G02B 26/0833 |
| 2018/0143646 A1* | 5/2018 | Suk | G05D 1/0253 |
| 2018/0282147 A1 | 10/2018 | Shinkawa et al. | |
| 2019/0086662 A1* | 3/2019 | Matsuzaki | B60K 35/00 |

* cited by examiner

MOVABLE DEVICE, IMAGE PROJECTION APPARATUS, HEADS-UP DISPLAY, LASER HEADLAMP, HEAD-MOUNTED DISPLAY, OBJECT RECOGNITION DEVICE, AND VEHICLE

CROSS-REFERENCE TO RELATED APPLICATION

This patent application is based on and claims priority pursuant to 35 U.S.C. § 119(a) to Japanese Patent Application No. 2018-120205, filed on Jun. 25, 2018, in the Japan Patent Office, the entire disclosure of which is hereby incorporated by reference herein.

BACKGROUND

Technical Field

Embodiments of the present disclosure relate to a movable device, an image projection apparatus, a head-up display (HUD), a laser headlamp, a head mount display (HMD), an object recognition device, and a vehicle.

Background Art

In recent years, with the development of micromachining technology applying semiconductor manufacturing technology, development of micro electro mechanical systems (MEMS) device manufactured by micromachining silicon or glass is advancing.

A MEMS device is known as a movable device that includes an elastic beam section provided with a drive unit, and a movable section provided with a reflector on its substrate, which are combined as a single unit. The movable device is configured to drive the movable section using the drive unit formed by superposing piezoelectric material films on the elastic beam section.

SUMMARY

In one aspect of this disclosure, there is provided an improved movable device including a reflector; a movable section including the reflector; a first drive section connected to the movable section, the first drive section configured to drive the movable section; a first support connected to the first drive section to support the first drive section; and two adjusters disposed symmetrically on the movable section with respect to the reflector.

BRIEF DESCRIPTION OF THE DRAWINGS

The aforementioned and other aspects, features, and advantages of the present disclosure will be better understood by reference to the following detailed description when considered in connection with the accompanying drawings, wherein.

Figure 1:
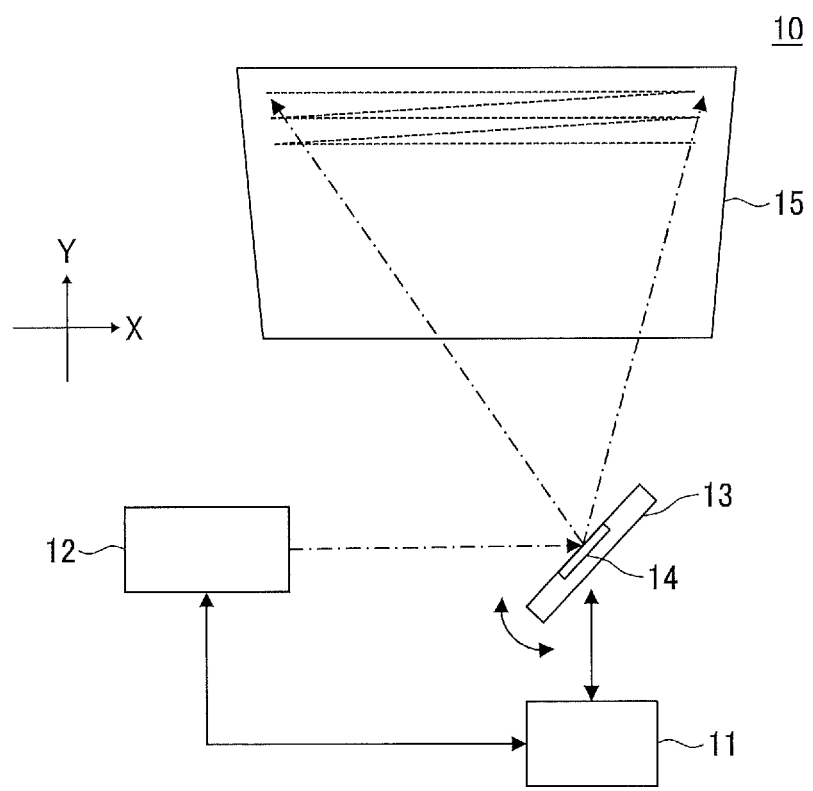
FIG. 1 is an illustration of an optical scanning system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable.

Embodiments of the present disclosure are described in detail with reference to the drawings. Like reference numerals designate identical or corresponding components throughout the several views and a description of same is omitted.

Hereinafter, embodiments of the present disclosure are described in detail.

With initially reference to FIGS. 1 to 4, an optical scanning system to which a movable device according to an embodiment of the present disclosure is applied is described below in detail.

FIG. 1 is an illustration of an optical scanning system 10 according to an embodiment of the present disclosure. As illustrated in FIG. 1, the optical scanning system 10 deflects light emitted from a light-source device 12 in accordance with the control of a controller 11, with a reflecting plane 14 included in a movable device 13, so as to optically scan a surface 15 to be scanned (target surface).

The optical scanning system 10 includes the controller 11, the light-source device 12, and the movable device 13 including the reflecting plane 14.

For example, the controller 11 is an electronic circuit unit provided with a central processing unit (CPU) and a field-programmable gate array (FPGA). For example, the movable device 13 is provided with a reflecting plane 14, and the movable device 13 serves as a micro-electromechanical system (MEMS) that is capable of moving the reflecting plane 14. The light-source device 12 is, for example, a laser device that emits a laser beam. The target surface 15 to be scanned is, for example, a screen.

The controller 11 generates a control instruction of the light-source device 12 and the movable device 13 based on the acquired optical scanning information, and outputs a drive signal to the light-source device 12 and the movable device 13 based on the control instruction.

The light-source device 12 emits light based on the received drive signal. The movable device 13 moves the reflecting plane 14 in at least one of a uniaxial direction and a biaxial direction, based on the received drive signal.

With this configuration, for example, the reflecting plane 14 of the movable device 13 is biaxially moved in a reciprocating manner within a predetermined range, and the light emitted from the light-source device 12 to strike the reflecting plane 14 is deflected about one-axis to perform optical scanning, under control of the controller 11, which is based on the image data that is an example of the optical scanning information. Accordingly, an image can be projected onto the target surface 15 as desired.

The details of the movable device of the present embodiment and the details of the control by the controller are described later.

Figure 2:
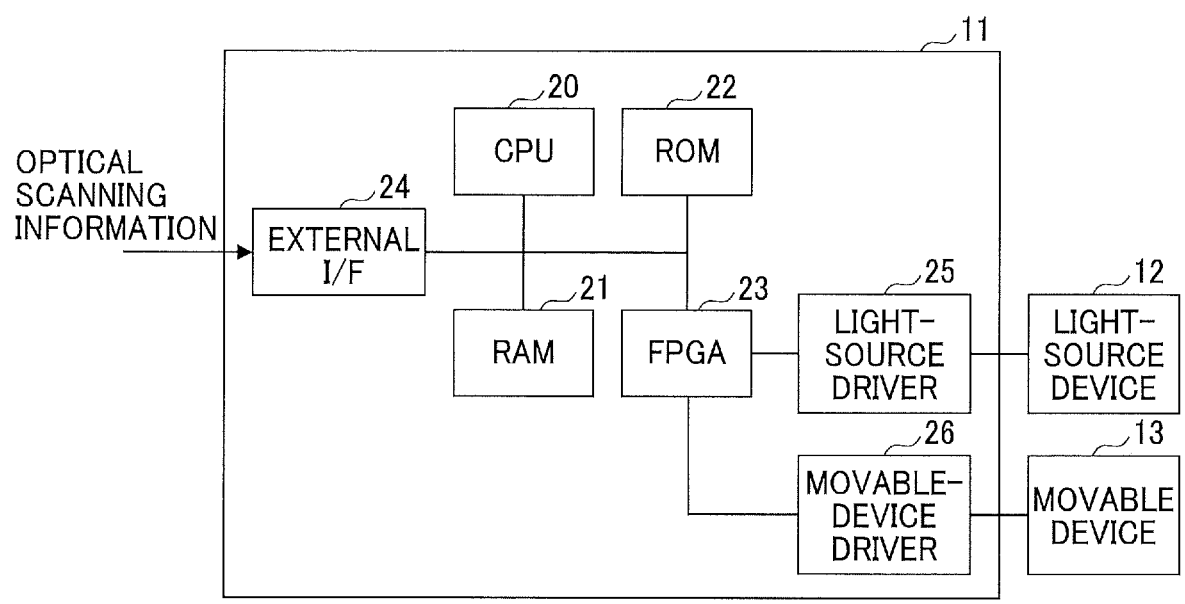
FIG. 2 is a hardware block diagram of an example configuration of the optical scanning system in FIG. 1.

Next, the hardware configuration of an example of the optical scanning system 10 is described with reference to FIG. 2. FIG. 2 is a hardware block diagram of an example configuration of the optical scanning system 10.

As illustrated in FIG. 2, the optical scanning system 10 includes the controller 11, the light-source device 12, and the movable device 13, which are electrically connected to one another. The controller 11 includes a central processing unit (CPU) 20, a random access memory (RAM) 21, a read only memory (ROM) 22, a field-programmable gate array (FPGA) 23, an external interface (I/F) 24, a light-source driver 25, and a movable-device driver 26.

The CPU 20 loads into the RAM 21 a program or data from a storage device such as the ROM 22 and performs processes. Accordingly, the controls or functions of the entirety of the controller 11 are implemented. That is, the CPU 20 serve as a processor.

The RAM 21 is a volatile storage device that temporarily stores data or a computer program.

The ROM 22 is a non-volatile storage device that can hold programs and data even after the power is turned off, and stores processing programs and data that the CPU 20 executes to control each function of the optical scanning system 10.

The FPGA 23 is a circuit that outputs a control signal to the light-source driver 25 and the movable-device driver 126 according to the processes performed by the CPU 120.

For example, the external interface 24 is an interface with an external device or the network. The external device includes, for example, a host device such as a PC (Personal Computer), and a storage device such as a USB memory, an SD card, a CD, a DVD, an HDD, and an SSD.

For example, the network may be a controller area network (CAN) of a vehicle, a local area network (LAN), and the Internet. The external interface 24 is satisfactory as long as it has a configuration by which connection to an external device or communication with an external device is achieved. The external I/F 24 may be provided for each external device.

The light-source driver 25 is an electric circuit that outputs a drive signal such as a drive voltage to the light-source device 12 in accordance with the received control signal.

The movable-device driver 26 is an electric circuit that outputs a drive signal such as a drive voltage to the movable device 13 in accordance with the received control signal.

In the controller 11, the CPU 20 acquires the optical scanning information from an external device or a network through the external interface 24.

The optical scanning information may be stored in the ROM 122 or in the FPGA 123 in the controller 111. Alternatively, a storage device such as a solid state disk (SSD) may be newly provided in the controller 111 and the optical scanning information may be stored in the storage device.

In this description, the optical scanning information is information indicating the way of optical scanning to be performed on the target surface 15. For example, the optical scanning information is image data in a case where an image is to be displayed by optical scanning, and the optical scanning information is optically writing data indicating the order and portion of writing in a case where optical writing is to be performed by optical scanning.

Furthermore, for example, the optical scanning information is irradiation data indicating the timing and range of irradiation of light for object recognition in a case where an object is to be recognized by optical scanning.

The controller 11 according to the present embodiment can implement the functional configuration described below by using commands from the CPU 20 and the hardware configuration illustrated in FIG. 2.

Figure 3:
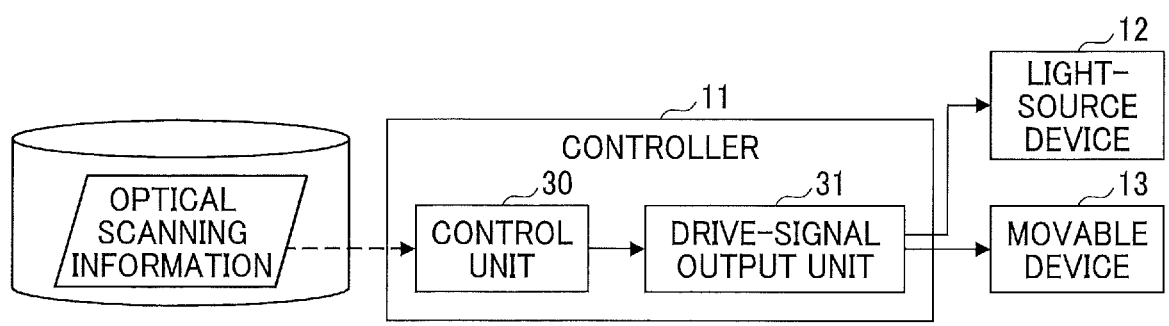
FIG. 3 is a functional block diagram of a controller according to an embodiment of the present disclosure.

A functional configuration of the controller 11 of the optical scanning system 10 is described below with reference to FIG. 3. FIG. 3 is a functional block diagram of the controller 11 according to an embodiment of the present disclosure.

As illustrated in FIG. 3, the controller 11 includes a control unit 30 and a drive-signal output unit 31 as functions.

The control unit 30 is implemented by, for example, the CPU 20, the FPGA 23, and the like, and acquires optical scanning information from an external device, converts the optical scanning information into a control signal, and outputs the control signal to the drive-signal output unit 31.

For example, the controller unit 30 acquires image data from a device such as an external device, as the optical scanning information, generates a control signal from the image data through predetermined processing, and outputs the control signal to the drive-signal output unit 31.

The drive-signal output unit 31 is implemented by, for example, the light-source driver 25 and the movable-device driver 26, to output the drive signal to the light-source device 12 or the movable device 13 based on the received control signal.

The drive signal is a signal for controlling the drive of the light-source device 12 or the movable device 13.

For example, the drive signal of the light-source device 12 is a drive voltage that controls the irradiation timing and the irradiation intensity of the light source. Moreover, for example, the drive signal in the movable device 13 is a drive voltage used to control the timing and range of motion where the reflecting plane 14 provided for the movable device 13 is moved.

Figure 4:
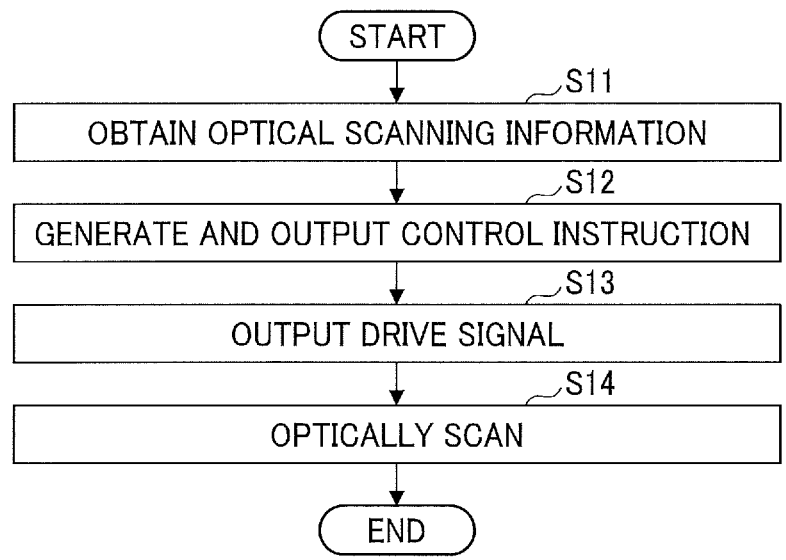
FIG. 4 is a flowchart of an example processing of the optical scanning system.

Next, the process of optically scanning the target surface 15 performed by the optical scanning system 10 is described with reference to FIG. 4. FIG. 4 is a flowchart of an example process performed by the optical scanning system 10.

In step S11, the control unit 30 acquires optical scanning information from, for example, an external device.

In step S12, the control unit 30 generates a control signal from the acquired optical scanning information, and outputs the control signal to the drive-signal output unit 31.

In step S13, the drive-signal output unit 31 outputs a drive signal to the light-source device 12 and the movable device 13 based on the received control signal.

In step S14, the light-source device 12 emits light based on the received drive signal. In addition, the movable device 13 moves the reflecting plane 14 based on the received drive signal.

The driving of the light-source device 12 and the movable device 13 causes light to be deflected in any desired direction, and optical scanning is performed.

In the above optical scanning system 10, a single controller 11 has a device and a function for controlling the light-source device 12 and the movable device 13. However, a control device for the light-source device and a control device for the movable device may be separate elements.

In the optical scanning system 10 according to the present embodiment, a single controller 11 has the functions of the control unit 30 and the functions of the drive-signal output unit 31 for the light-source device 12 and the movable device 13, respectively. These functions may be implemented by separate elements. for example, a separate drive-signal output device with the drive-signal output unit 31 may be provided in addition to the controller 11 including the control unit 30.

An optical deflection system that performs optical deflection may be configured by the movable device 13 provided with the reflecting plane 14 and the controller 11 of the above optical scanning system 10.

Next, an image projection apparatus to which the movable apparatus according to the embodiments of the present disclosure is applied is described with reference to FIGS. 5 and 6.

Figure 5:
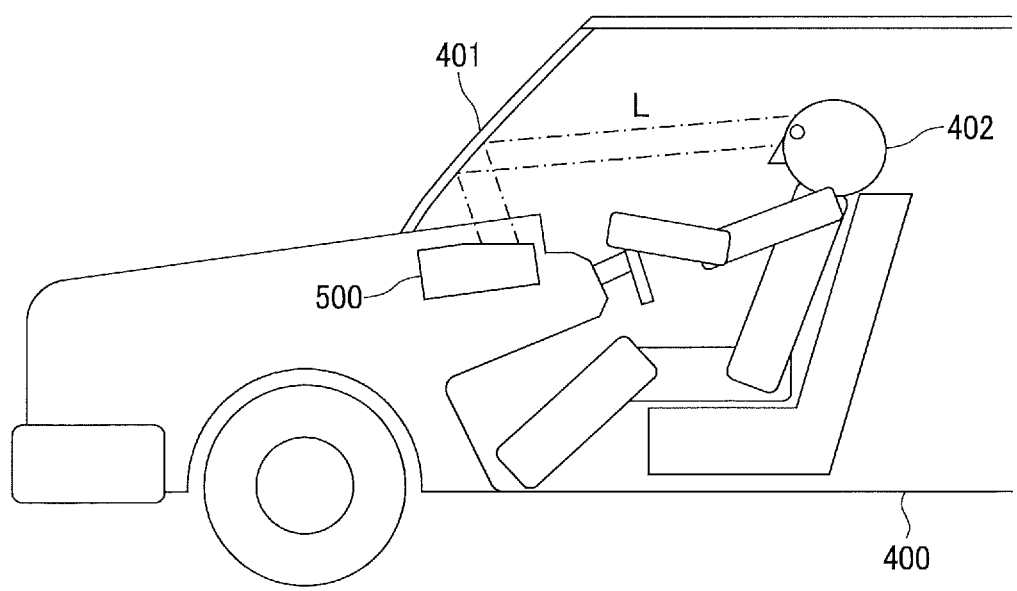
FIG. 5 is an illustration of an example car equipped with a HUD.

FIG. 5 is a schematic view of a vehicle 400 (for example, a car) equipped with a HUD 500 as an example of an image projection apparatus. FIG. 6 is a schematic view of an example of the HUD 500.

The image projection apparatus is configured to project an image by optically scanning, and is, for example, a HUD.

As illustrated in FIG. 5, for example, the HUD 500 is disposed near a windshield 401 of the vehicle 400.

Projection light L that is emitted from the HUD 500 is reflected by the windshield 401 and directed to an observer (a driver 402) as a user.

Accordingly, the driver 402 can visually recognize an image or the like projected by the HUD 500 as a virtual image. Note that a combiner may be disposed on the inner wall of the windshield 401 so that the user can visually recognize a virtual image formed by the projection light L that is reflected by the combiner.

Figure 6:
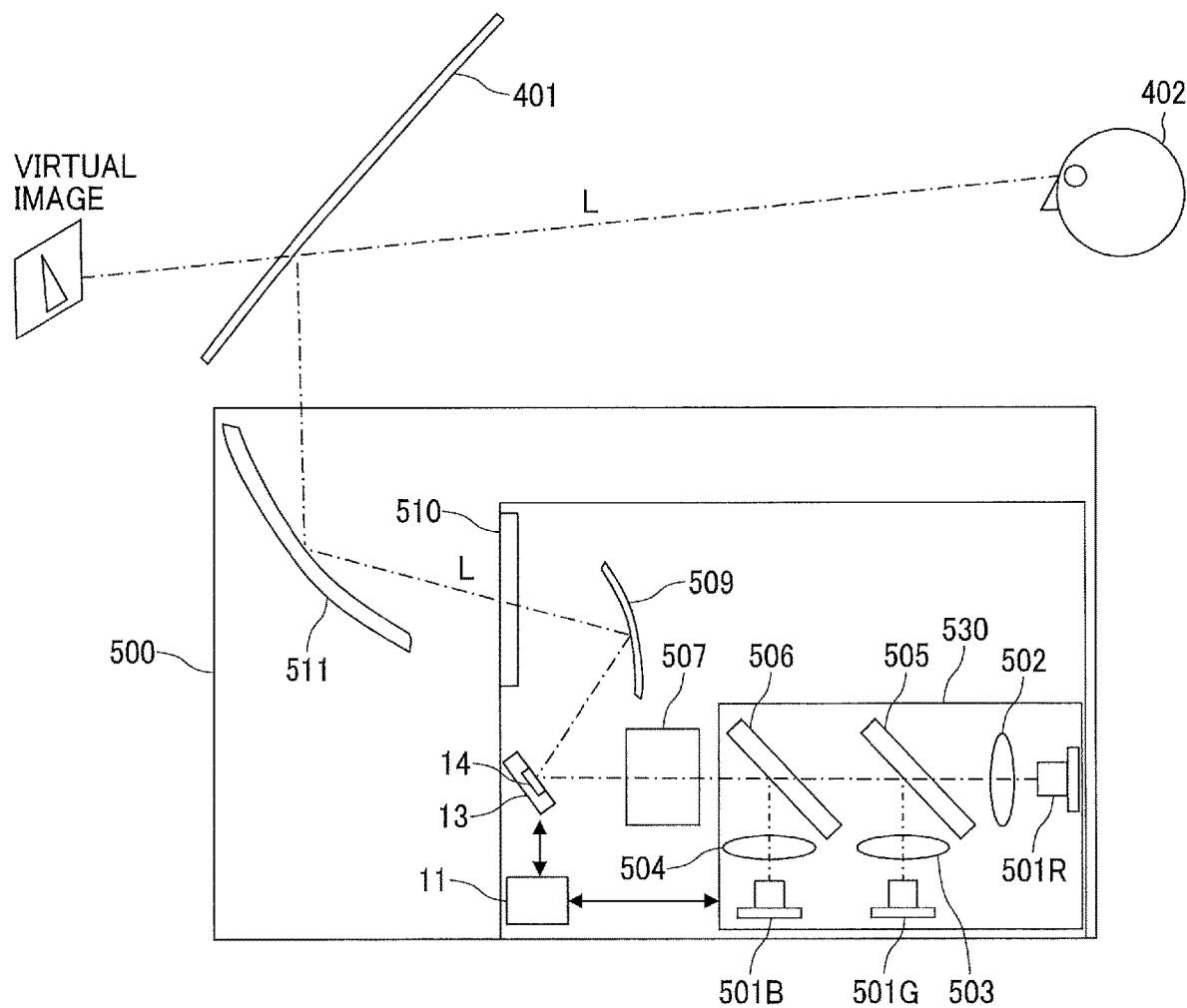
FIG. 6 is a schematic view of an example HUD.

As illustrated in FIG. 6, the HUD 500 emits laser beams from red, green, and blue laser beam sources 501R, 501G, and 501B, respectively.

The emitted laser beams pass through an optical system for receiving light, and then are deflected by the movable device 13 having the reflecting plane 14. The optical system includes collimator lenses 502, 503, and 504 provided for the laser beam sources 501R, 501G, and 501B, respectively, two dichroic mirrors 505 and 506, and a light-intensity adjuster 507.

The deflected laser beam passes through a projection optical system for emitting light, and is projected onto a screen. The projection optical system includes a free-form surface mirror 509, an intermediate screen 510, and a projection mirror 511.

In the HUD 500, the laser beam sources 501R, 501G, 501B, the collimator lenses 502, 503, 504, and the dichroic mirrors 505, 506 are combined as a single unit, i.e., a light source unit 530 in an optical housing.

The HUD 500 projects an intermediate image displayed on the intermediate screen 510 onto the windshield 401 of the vehicle 400 to allow the driver 402 to visually recognize the intermediate image as a virtual image.

The laser beams of RGB colors emitted from the laser beam sources 501R, 501G, and 501B are approximately collimated by the collimator lenses 502, 503, and 504, and are combined by the two dichroic mirrors 505 and 506.

The light intensity of the combined laser beams is adjusted by the light-intensity adjuster 507, and then two-dimensional scanning is performed by the movable device 13 provided with the reflecting plane 14.

The projection light L that has been two-dimensionally scanned by the movable device 13 is reflected by the free-form surface mirror 509 so as to correct the distortion, and then is collected and focused onto the screen 510. Accordingly, an intermediate image is displayed.

The intermediate screen 510 is constituted by a microlens array in which a plurality of microlenses are two-dimensionally arranged, and enlarges the projected light L incident on the intermediate screen 510 in units of microlens.

The movable device 13 moves the reflecting plane 14 biaxially in a reciprocating manner to perform two-dimensional scanning with the projected light L incident on the reflecting plane 14. The driving of the movable device 13 is controlled in synchronization with the light-emitting timing of the laser beam sources 501R, 501G, and 501B.

In the above description, the HUD 500 is described as an example of the image projection apparatus. However, no limitation is indicated thereby, and the image projection apparatus may be any apparatus that performs optical scanning, using the movable device 13, to project an image.

For example, the present disclosure is also applicable to a projector that projects an image on a display screen, a head-mounted display that is incorporated in a wearable member on the head of the observer, for example, and that projects an image on a reflective-and-transmissive screen of the wearable member or on an eye ball as a screen, and the like.

The image projection apparatus may be incorporated in, not only a vehicle or the wearable member, but also, for example, a mobile object such as an aircraft, a ship, or a moving robot, and an immobile object such as an operation robot that operates a driving target such as a manipulator without moving from the installed location.

The HUD 500 is an example of the "head-up display" described in the claims.

Next, an optical writing device to which the movable device 13 according to an embodiment of the present disclosure is applied is described in detail with reference to FIGS. 7 and 8.

Figure 7:
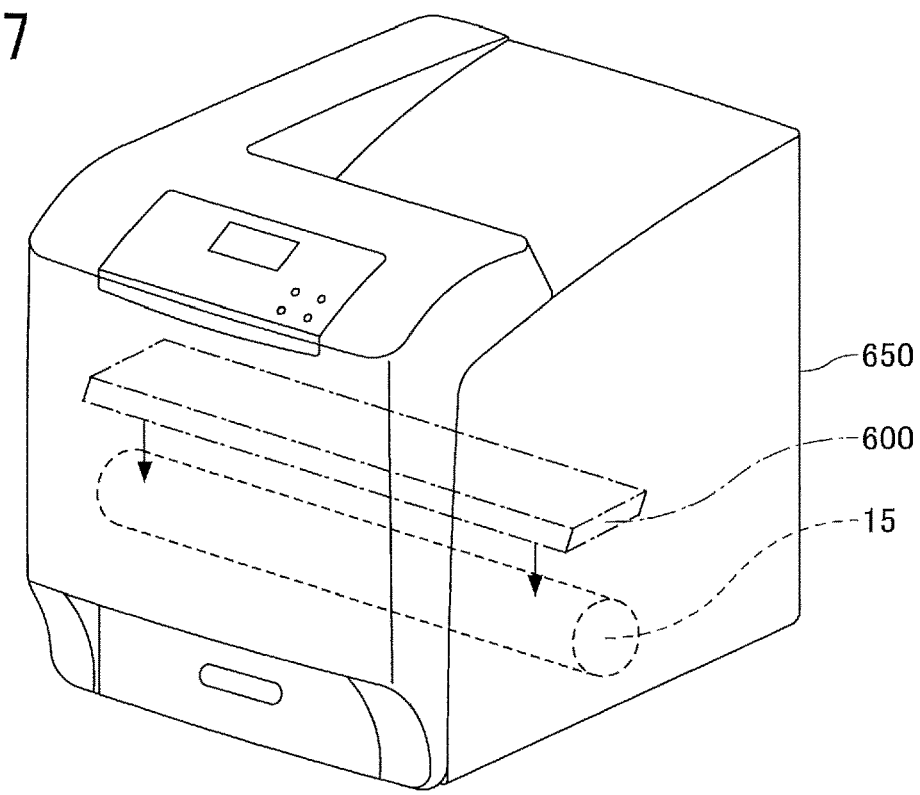
FIG. 7 is a schematic view of an example image forming apparatus equipped with an optical writing device.

FIG. 7 is an illustration of an example image forming apparatus equipped with an optical writing device 600. FIG. 8 is a schematic view of an example optical writing device 600.

As illustrated in FIG. 7, the optical writing device 600 is used as a component of an image forming apparatus typified by a laser printer 650, for example, having printer functions using laser beams.

In the image forming apparatus, the optical writing device 600 performs optical scanning on a photoconductor drum, which is the target surface 115, by using one or more laser beams, thereby performing optical writing on the photoconductor drum.

Figure 8:
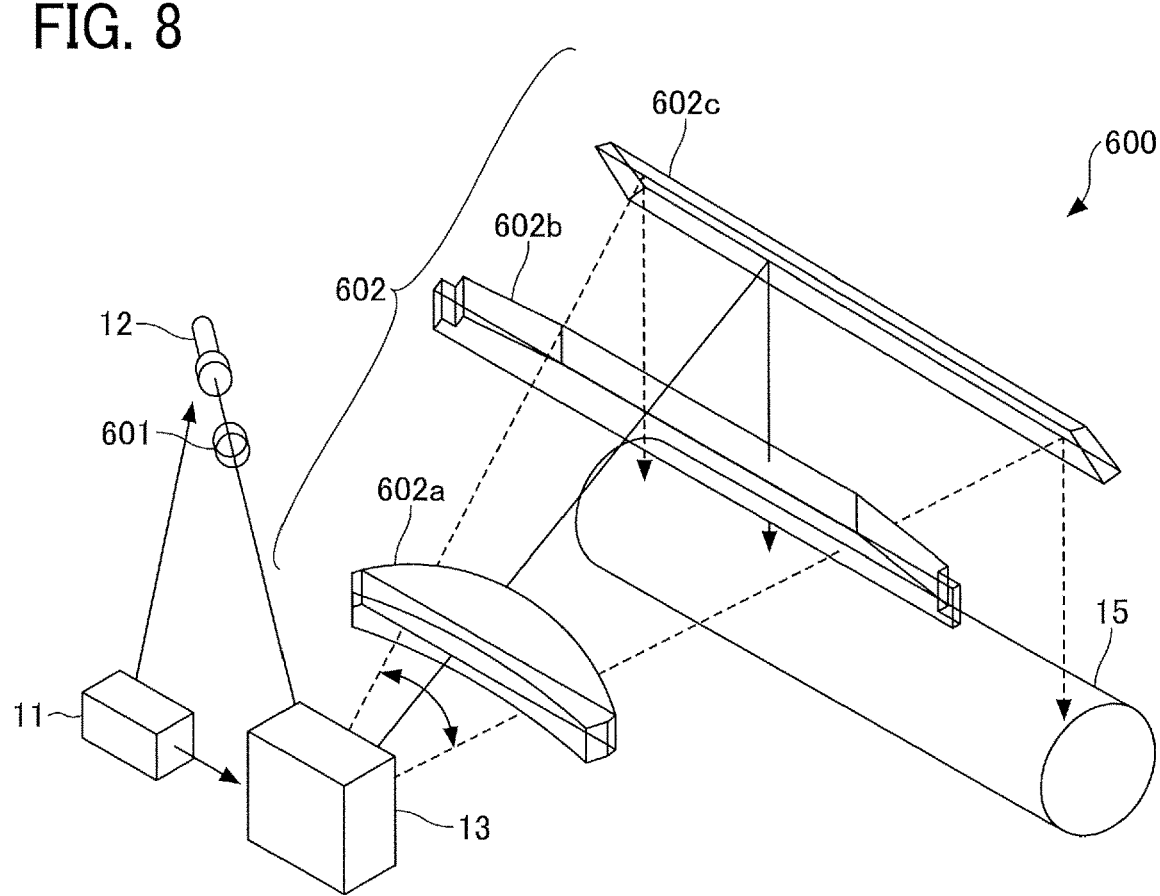
FIG. 8 is a schematic view of an example of an optical writing device.

As illustrated in FIG. 8, in the optical writing device 600, the laser beam from the light-source device 12 such as a laser element passes through an image forming optical system 601 such as a collimator lens and is then deflected uniaxially or biaxially by the movable device 13 having the reflecting plane 14.

The laser beam deflected by the movable device 13 passes through a scanning optical system 602 constituted by a first lens 602a, a second lens 602b, and a reflecting mirror unit 602c, and is emitted onto the target surface 15 (e.g., a photoconductor drum or photosensitive paper), and thereby optical writing is performed. The scanning optical system 602 forms a laser beam in the form of a spot on the target surface 15. The movable device 13 having the light-source device 12 and the reflecting plane 14 is driven based on the control of the controller 11.

As described above, the optical writing device 600 can be used as a component of the image forming apparatus that serves as a printer using laser beams.

Moreover, by allowing the scanning optical system to scan in a uniaxial or biaxial manner, the optical writing device 600 can also be used as a component of an image forming apparatus such as a laser label apparatus that deflects laser beam to perform optical scanning on thermal media and print letters by heating.

The movable device 13 having the reflecting plane 14 to be applied to the optical writing device is advantageous in saving power of the optical writing device because power consumption for driving the movable device 13 is less than that for driving a polygon mirror or the like.

The movable device 13 makes a smaller wind noise when the mirror substrate oscillates compared with a polygon mirror, and thus is advantageous in achieving low noise of an optical writing device. The optical writing device requires much smaller footprint than that of a polygon mirror, and the amount of heat generated by the movable device 13 is small. Accordingly, downsizing is easily achieved, and thus the optical writing device is advantageous in downsizing the image forming apparatus.

Next, an object recognition device to which the movable device 13 according to an embodiment of the present disclosure is applied is described in detail with reference to FIGS. 9 and 10.

Figure 9:
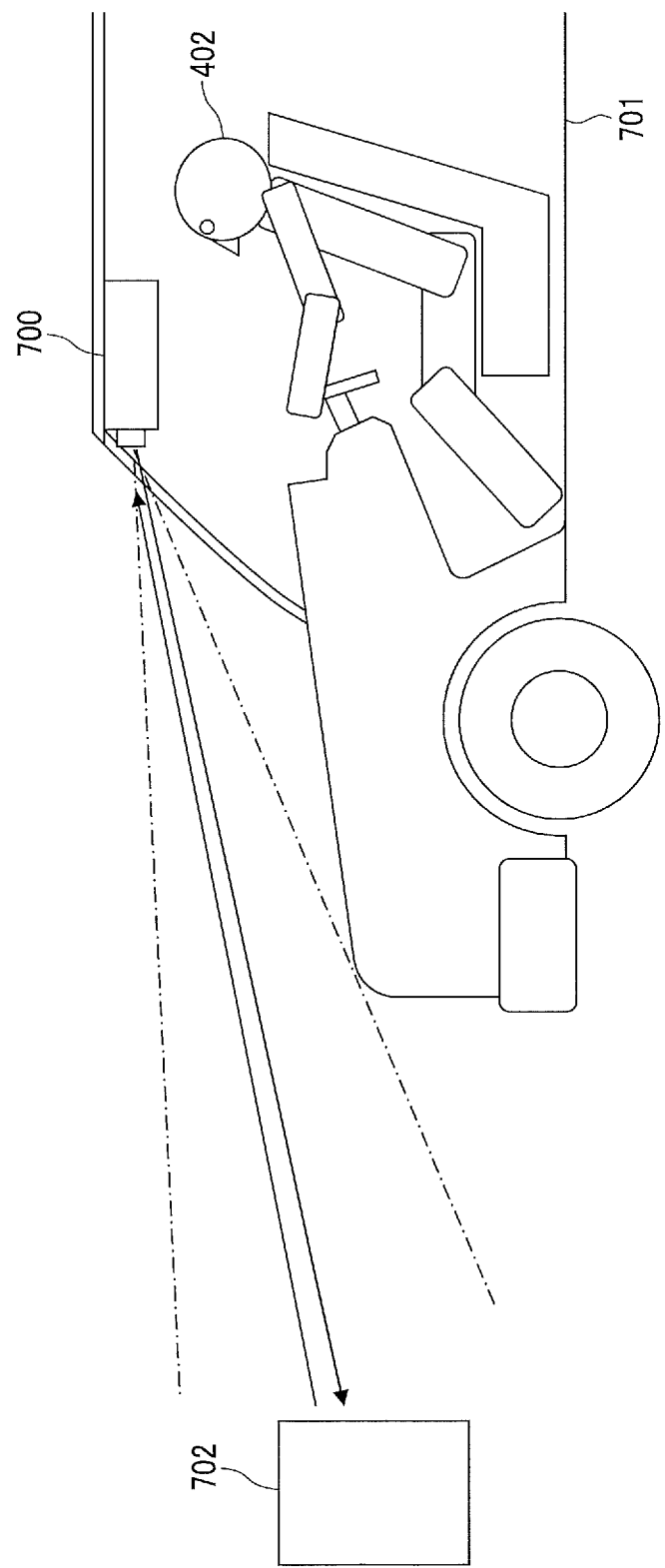
FIG. 9 is an illustration of another example car equipped with a laser radar (LIDAR)

FIG. 9 is a schematic diagram of a vehicle provided with a LiDAR device that serves as an object recognition device according to an embodiment of the present disclosure. FIG. 10 is a schematic view of an example LiDAR.

The object recognition device is an apparatus that recognizes an object in a target direction, and is, for example, a LiDAR device.

As illustrated in FIG. 9, for example, a LiDAR device 700 is mounted on a vehicle 701 to perform optical scanning in a target direction and receive the light reflected from an object 702 that exists in the target direction. Accordingly, the object 702 can be recognized by the LiDAR device 700.

Figure 10:
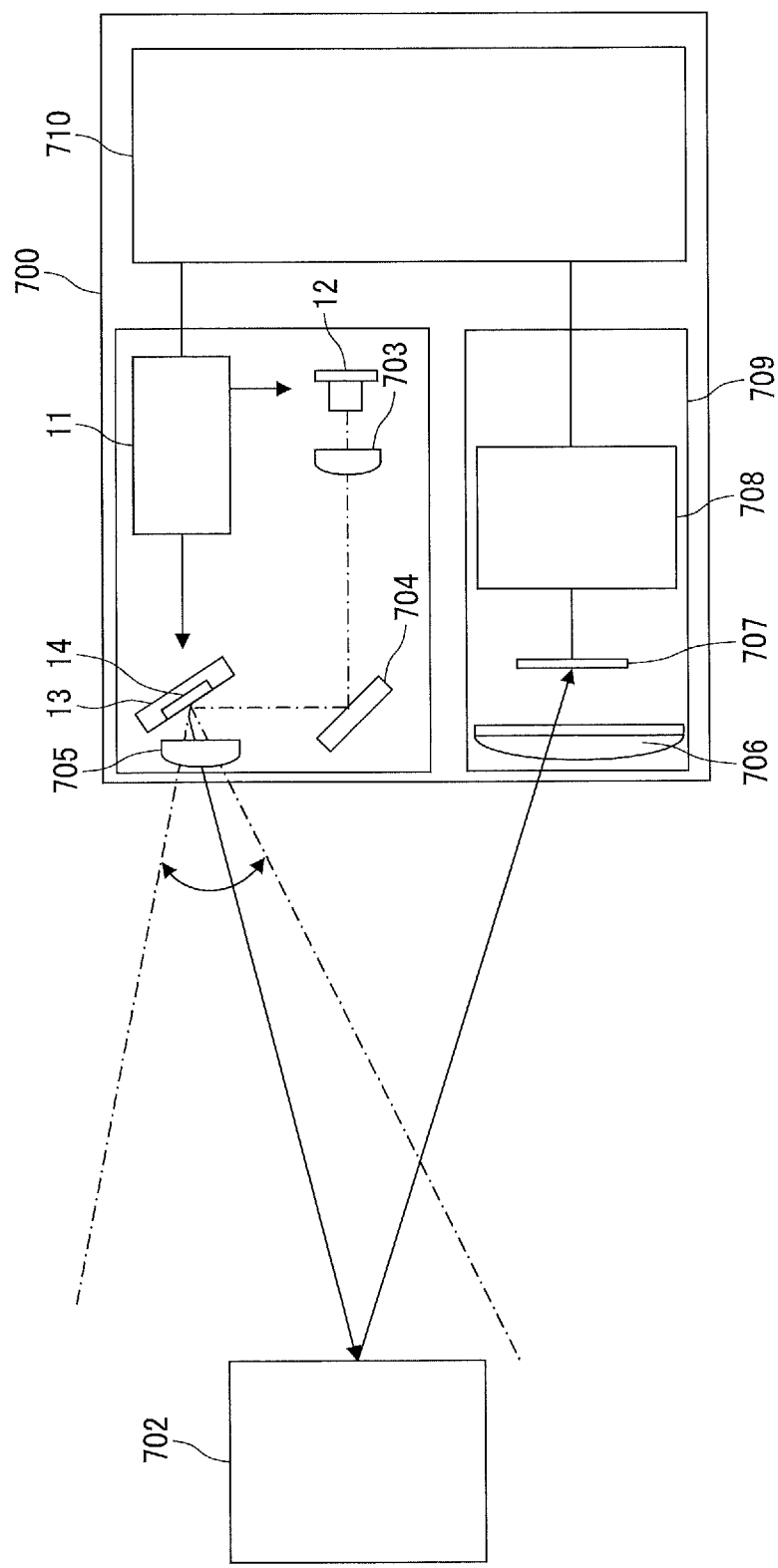
FIG. 10 is a schematic view of an example LIDAR.

As illustrated in FIG. 10, the laser beam emitted from the light-source device 12 passes through an optical system for receiving light, and is caused to scan uniaxially or biaxially by the movable device 13 having the reflecting plane 14.

are emitted to the object 702 ahead of the apparatus, as passing through, for example, a projection lens 705 that serves as a projection optical system. The driving of the movable device 13 and the light-source device 12 is controlled by the controller 11. The light reflected by the object 702 is detected by the photodetector 709.

More specifically, the reflected light passes through, for example, a condenser lens 706 that serves as a light-receptive optical system, and is received by an image sensor 707. Then, the image sensor 707 outputs a detected signal to a signal processing circuit 708. The signal processing circuit 708 performs predetermined processing on the input detected signal, such as binarization or noise processing, and outputs the result to a distance measuring circuit 710.

The distance measuring circuit 710 determines whether the object 702 is present based on the time difference between the timing at which the light-source device 12 emits laser beam and the timing at which the photodetector 709 receives the laser beam or the phase difference among pixels of the image sensor 707 that receives light. Moreover, the distance measuring circuit 710 calculates distance information regarding a distance to the object 702.

The movable device 13 that is provided with the reflecting plane 14 cannot easily be broken and is compact compared with a polygon mirror, and thus, a highly durable and compact LiDAR device can be provided. Such a LiDAR device is attached to, for example, a vehicle, an aircraft, a ship, a robot, or the like, and can perform optical scanning within a predetermined range to determine whether an obstacle is present or to recognize the distance to the obstacle.

In the present embodiment, the LiDAR device 700 is described as an example of the object recognition device. However, no limitation is intended thereby. The object recognition device may be any apparatus that performs optical scanning by controlling the movable device 13 provided with the reflecting plane 14, using the controller 11, and that receives the receives the reflected laser beam using a photodetector to recognize the object 702.

For example, the present disclosure is also applicable to a biometric authentication apparatus, a security sensor, or a component of a three-dimensional scanner, for example. The biometric authentication apparatus performs optical scanning on a hand or face to obtain distance information, calculates object information such as the shape of the object based on the distance information, and refers to records to recognize the object. The security sensor performs optical scanning in a target range to recognize an incoming object. The three-dimensional scanner performs optical scanning to obtain distance information, calculates object information such as the shape of the object based on the distance information to recognize the object, and outputs the object information in the form of three-dimensional data.

Next, a laser headlamp 50 in which the movable device of the present embodiment is applied to a headlight of a car is described with reference to FIG. 11.

Figure 11:
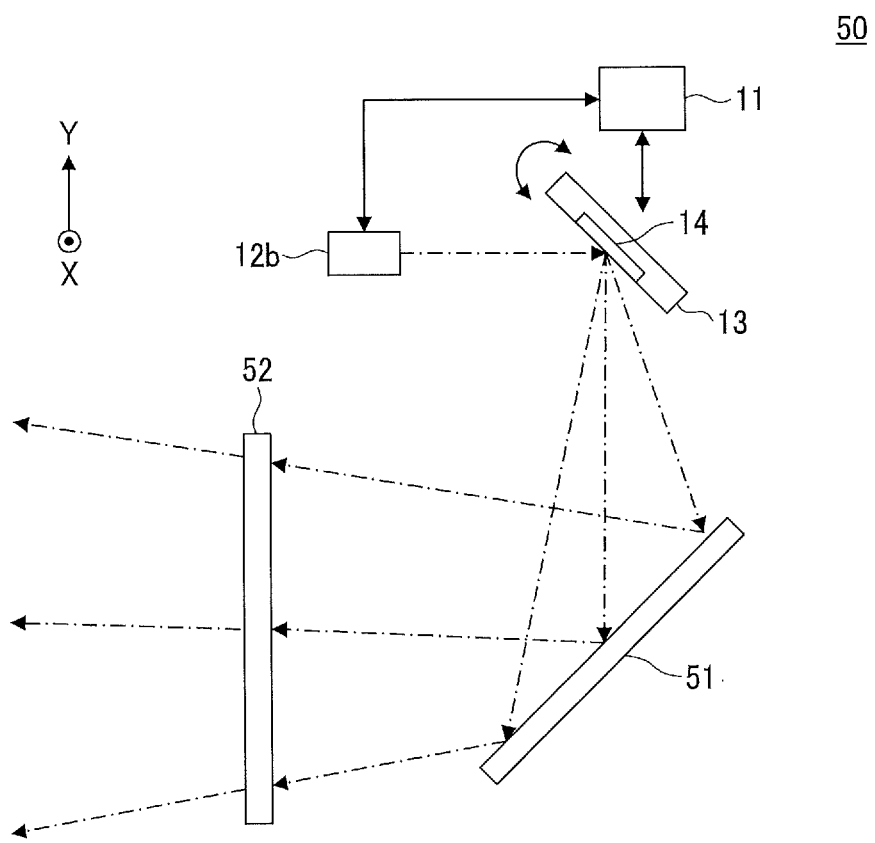
FIG. 11 is a schematic view of an example configuration of a laser headlamp.

FIG. 11 is a schematic view of an example configuration of a laser headlamp 50.

The laser headlamp 50 includes a controller 11, a light-source device 12b, a movable device 13 provided with a reflecting plane 14, a mirror 51, and a transparent plate 52.

The light-source device 12b is a light source that emits blue laser beams. The laser beams emitted from the light-source device 112b is directed to the movable device 13 and is reflected by the reflecting plane 14. The movable device 13 moves the reflecting plane 14 in the XY-direction based on the signal from the controller 11, and two-dimensionally scans the blue laser beams emitted from the light-source device 12 in the XY-direction.

The scanning light of the movable device 13 is reflected by the mirror 51, and strikes on the transparent plate 152. The transparent plate 52 is coated with a yellow phosphor on the front surface or the back surface. The blue laser beams that are reflected by the mirror 151 is converted into white light whose color is within the range of the statutory color for a headlight as passing through the yellow phosphor (fluorescent material) of the transparent plate 152. Thereby, the front of the car is illuminated with white light from the transparent plate 52.

The scanning light of the movable device 13 scatters as passing through the fluorescent material of the transparent plate 52. Accordingly, glare is attenuated at an illuminated target in the area ahead of the car.

When the movable device 13 is applied to a headlight of a car, the color of light beams from the light-source device 12b and the color of the phosphor are not limited to blue and yellow, respectively.

For example, the light-source device 12b may emit near-ultraviolet light, and the transparent plate 52 may be coated with homogenized mixture of a plurality of kinds of fluorescent materials of red-green-blue (RGB) trichromatic colors. In this case as well, the light passing through the transparent plate 52 can be converted into white light, and the front of the car can be illuminated with white light.

Next, an HMD 60 to which the movable device 13 according to an embodiment of the present disclosure is applied is described in detail with reference to FIGS. 12 and 13.

Note that the HMD 60 is a head mounted display that can be mounted on a human head, and can be shaped like, for example, glasses.

Figure 12:
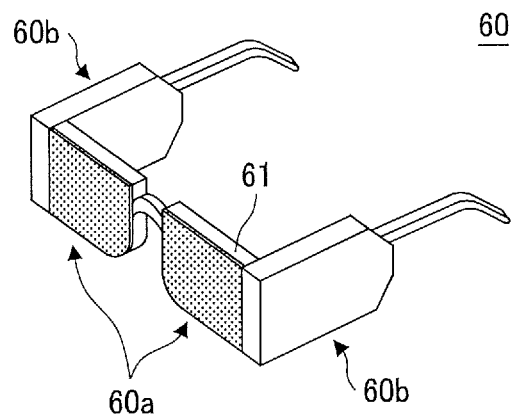
FIG. 12 is a perspective view of an example configuration of a (HMD)

FIG. 12 is a perspective view of the appearance of the HMD 60. In FIG. 12, the HMD 60 is constituted of a front 60a and a temple 60b provided substantially symmetrically on the left and right.

The front 60a can be configured by, for example, a light guide plate 61, and an optical system, a control device, and the like can be incorporated in the temple 60b.

Figure 13:
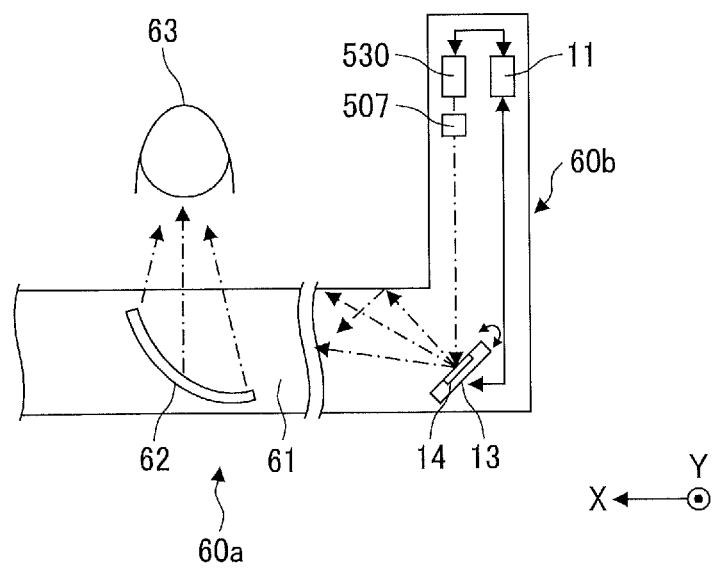
FIG. 13 is an illustration of a part of an example configuration of the HMD.

FIG. 13 is an illustration of a partial configuration of the HMD 60. Although the configuration for the left eye is illustrated in FIG. 13, the HMD 60 has the same configuration as that for the right eye.

The HMD 60 includes a controller 11, a light source unit 530, a light-intensity adjuster 507, a movable device 13 having a reflecting plane 14, a light guide plate 61, and a half mirror 62.

The light source unit 530 according to the present embodiment includes the laser beam sources 501R, 501G, and 501B, the collimator lenses 502, 503, and 504, and the dichroic mirrors 505 and 506, and these elements are combined as a single unit in an optical housing.

The laser beams of the RGB colors that are emitted from the laser beam sources 501R, 501G, and 501B are by the 502, 503, and 504 are combined by the two dichroic mirrors 505 and 506. The light source unit 530 emits combined parallel light.

The light intensity of the combined laser beams from the light source unit 530 is adjusted by the light-intensity adjuster 507, and directed to the movable device 13. The movable device 13 moves the reflecting plane 14 in the XY-direction based on the signal from the controller 11, and two-dimensionally scans the blue emitted from the light source unit 530.

The drive control of the movable device 13 is performed in synchronization with the light emission timings of the laser beam sources 501R, 501G, and 501B, and a color image is formed by the scanning light.

The scanning light of the movable device 13 strikes on the light guide plate 61. The light guide plate 61 guides the scanning light to the half mirror 62 while reflecting the scanning light on the inner wall surface. The light guide plate 61 is formed of material such as resin having transparency at the wavelength of the scanning light.

The half mirror 62 reflects the light from the light guide plate 61 to the back side of the HMD 60, and emits the light in the direction of the eyes of the wearer 63 of the HMD 60. The half mirror 62 has, for example, a free-form surface shape. The image of the scanning light is reflected by the half mirror 62, and then is formed on the retina of the wearer 63.

The image of the scanning light is formed on the retina of the wearer 63 due to the reflection at the half mirror 62 and the effect of the crystalline lens of eye balls. Moreover, due to the reflection at the half mirror 62, the spatial distortion of the image is corrected. The wearer 63 can observe an image formed by light scanned in the XY direction.

The wearer 63 observes an image of external light superimposed on the image of the scanning light because of the existence of the half mirror 62. A mirror may be provided instead of the half mirror 62 so that external light is blocked out and the wearer 63 observes only the image of the scanning light.

Next, the packaging of the movable device 13 according to an embodiment of the present disclosure is described with reference to FIG. 14.

Figure 14:
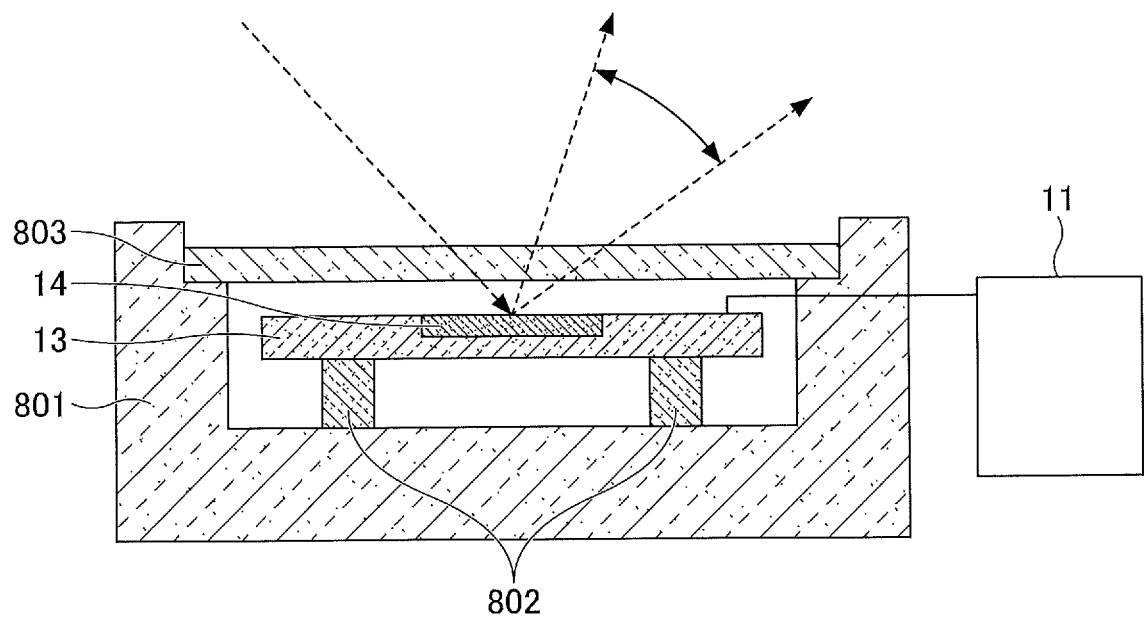
FIG. 14 is a schematic view of a first example packaged movable device.

FIG. 14 is a schematic view of a first example packaged movable device 13.

As illustrated in FIG. 14, the movable device 13 is mounted on a mounting member 802 inside a package 801. The package 801 is partly covered with and sealed by a transmissive member 803 so that the movable device 13 is packaged. The package is sealed with inert gas such as nitrogen therein. This configuration can prevent the deterioration of the movable device 13 due to oxidation, and increase the durability against changes in environment such as temperature.

Figure 15:
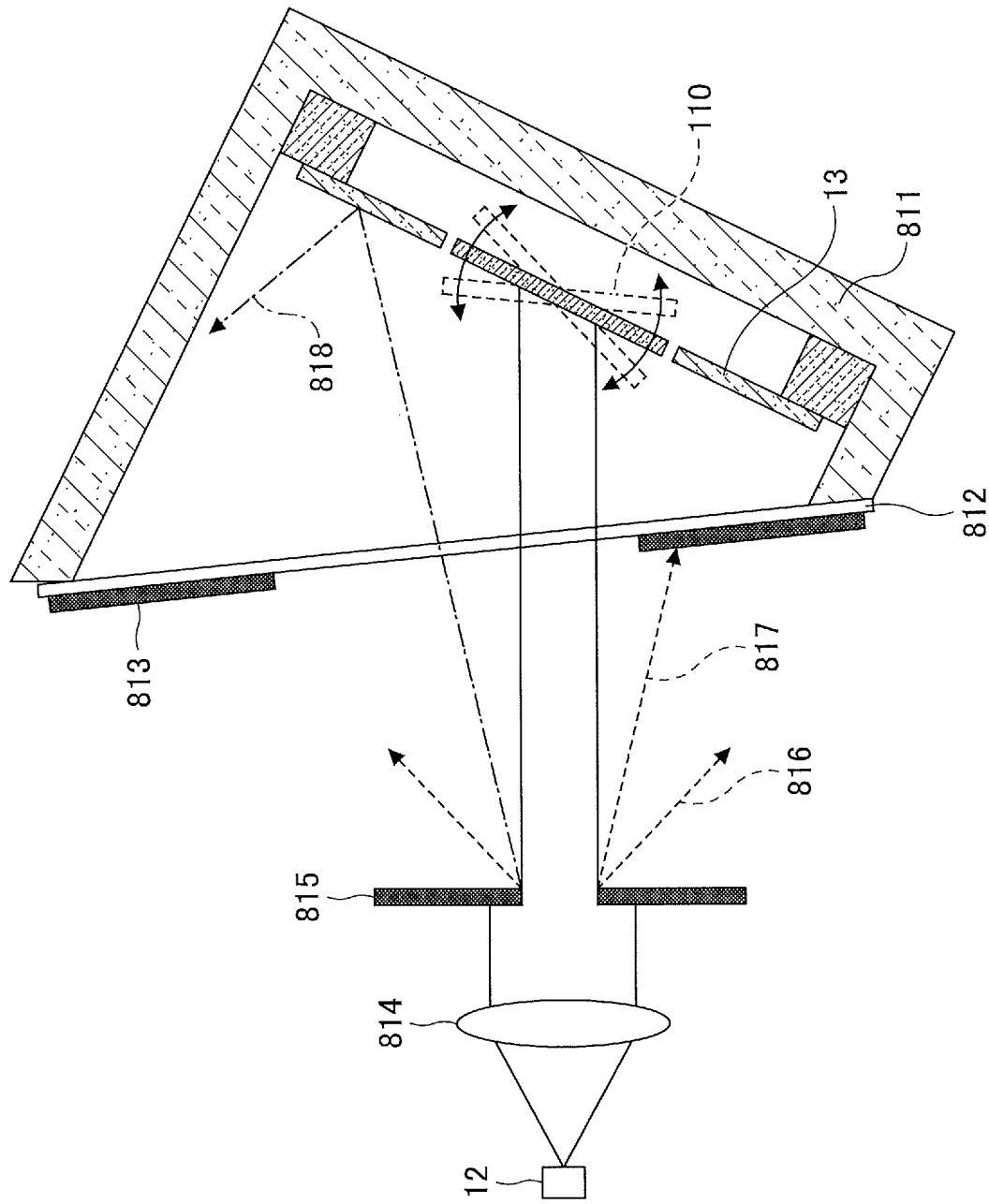
FIG. 15 is a schematic view of a second example packaged movable device.

FIG. 15 is an illustration of a second example packaged movable device 13.

As illustrated in FIG. 15, the movable device 13 including the movable section 110 is attached inside the package 811 having a transmissive member 812 such that the movable device 13 is tilted relative to the transmissive member 812.

For example, the plane on which the movable device 13 is disposed is not parallel to the transmissive member 812. The transmissive member 812 is provided with a package-side opening 813 to restrict the amount of light entering and exiting the package 811.

The package-side opening 813 has a region indicated by thick black lines that prevents the passage of light (blocks light) and another region between the thick black lines that allows for the passage of light. The package-side opening 813 is formed by providing a film that reflects and absorbs light in, for example, the transmissive member 812 to define the region that prevents the passage of light (blocks light).

The light emitted from the light-source device 12 is collimated by the lens 814, passes through a light-source-side opening 815, and strikes the package 811.

The light-source-side opening 815 restricts the amount of the light collimated by the lens 814 to, for example, make the intensity distribution of light emitted from a light source uniform.

Same as the package-side opening 813, the light-source-side opening 815 has a region indicated by thick black lines that prevents the passage of light (blocks light) and another region between the thick black lines that allows for the passage of light. The light-source-side opening 815 is, for example, a pinhole having a predetermined opening. The pinhole is formed, for example, by providing a through-hole corresponding to the opening in a metal plate.

The light enters the package 811 through the transmissive member 812, and is reflected by a reflector of the movable section 110. Then, the reflected light exits the package 811 through the transmissive member 812. Driving the movable section 110 causes the reflected light to scan the imaging plane.

Some light rays 816 and 817 of light diffracted by the light-source-side opening 815 are indicated by dotted lines in FIG. 15, and are undesired for the movable device 13. Such diffracted light is blocked by the package-side opening 813, which means that the diffracted light does not enter the package 811.

Further, the light ray 818 indicated by dot-dash lines is stray light corresponding to some light rays of the light diffracted by the light-source-side opening 815 that has been directed to enter the package 811. The light ray 818 is also undesired for the movable device 13. Such stray light is blocked by the package-side opening 813, and the transmissive member 812 is tilted relative to the plane on which the movable device 13 is disposed so as to prevent the stray light from exiting the package 811.

With the configuration illustrated in FIG. 15, desired light such as diffracted light 816 and 817 is prevented from entering the package 811, and undesired light such as stray light 818 is also prevented from exiting the package 811. This can prevent undesired light from reaching the image plane.

Figure 16:
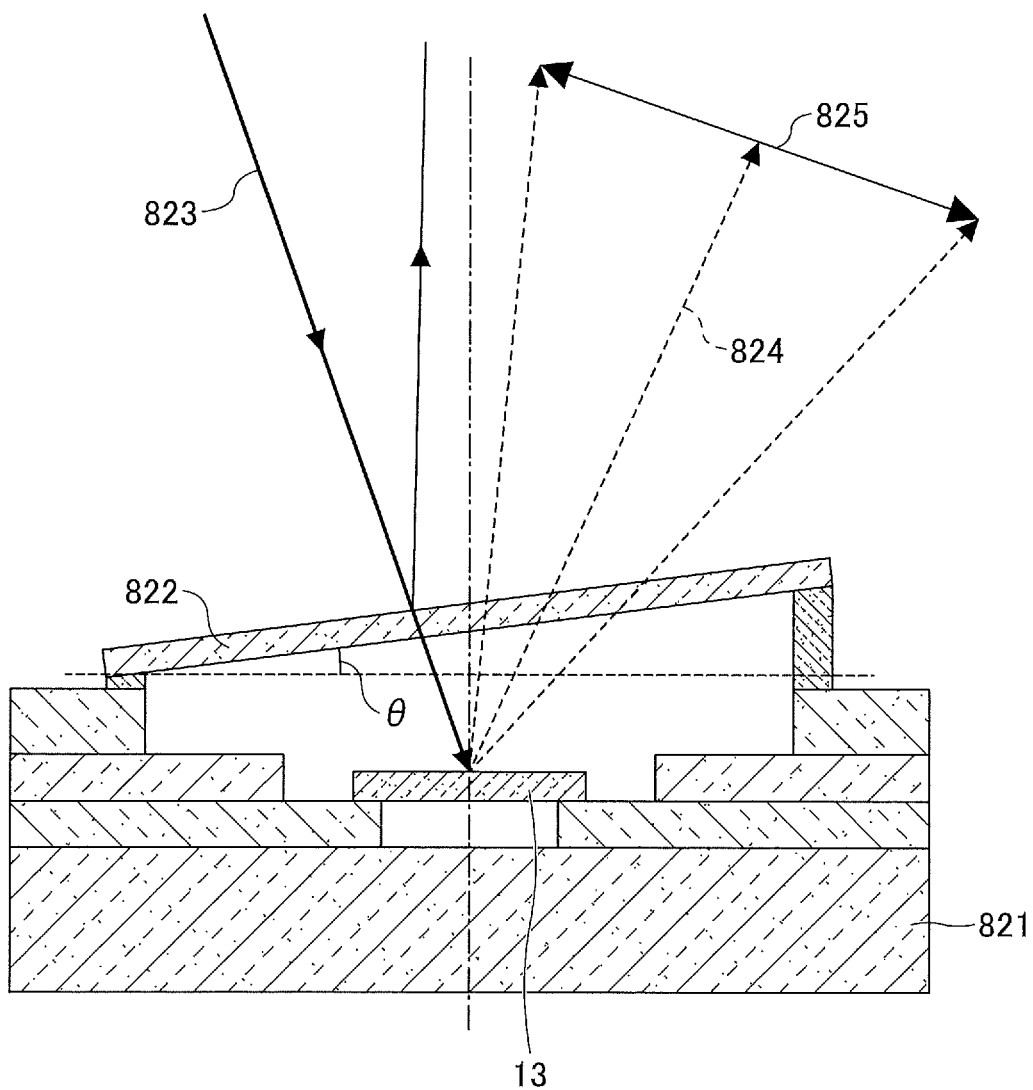
FIG. 16 is a schematic view of a third example packaged movable device.

FIG. 16 is an illustration of a third example packaged movable device 13.

As illustrated in FIG. 16, the movable device 13 is attached inside the package 821 including the transmissive member 822.

The light from the light-source device passes through the transmissive member 822 to enter the movable device 13, and moves for scanning as scanning light 824 indicated by broken lines does.

An effective range 825 indicated by thick arrows in FIG. 16 is an effective range in which light is moved for scanning by the movable device 13. For example, when the movable device 13 is used in an image forming apparatus, the effective range 825 is an image forming area (area for forming an image).

As illustrated in FIG. 16, the transmissive member 822 is attached to the package 82 so as to be tilted by an angle θ with respect to the inner bottom of the package 821. The angle θ is set such that the light reflected by the outer surface and the inner surface of the transmissive member 822 is not included in the effective range 825.

The angle θ is preferably in a range of from 5° to 65°. In this example, the angle θ is, for example, 15°.

This configuration prevents the undesired light such as multi-reflected light at the transmissive member 822 (light that is reflected multiple times at the transmissive member 822) from reaching the effective range 825.

Accordingly, deterioration of image quality can be reduced, for example, in an image forming apparatus.

When an anti-reflection film is formed on each side surface of the transmissive member 822, approximately zero comma several percent amount of light is still reflected by the anti-reflection film due to the manufacturing variation. In some cases, the amount of light reflected by the anti-reflection film might be larger than the amount of scanning light of the movable device 13.

However, the configuration as illustrated in FIG. 16 can eliminate the undesired light such as the light reflected by the anti-reflection film.

The following describes details of the movable device of the embodiments of the present disclosure used for the light deflection system, the light scanning system, the image projection apparatus, the optical writing device, the object recognition device, the laser headlamp and the HMD described above with reference to the drawings.

In each figure, the same reference numerals are given to the same constituent parts, and redundant explanation may be omitted in some cases.

In the description of the embodiment, a main scanning is an optical scanning with a second axis as the center of rotation, and a sub-scanning is an optical scanning with a first axis as the center of rotation.

The following expressions have the same meanings: the rotation around the first axis and the second axis, the swing around the first axis and the second axis, and the movement around the first axis and the second axis.

In the drawings, the X-direction is parallel to the first axis, and the Y-axis is parallel to the second axis. The Z-direction is perpendicular to the XY plane.

Figure 17:
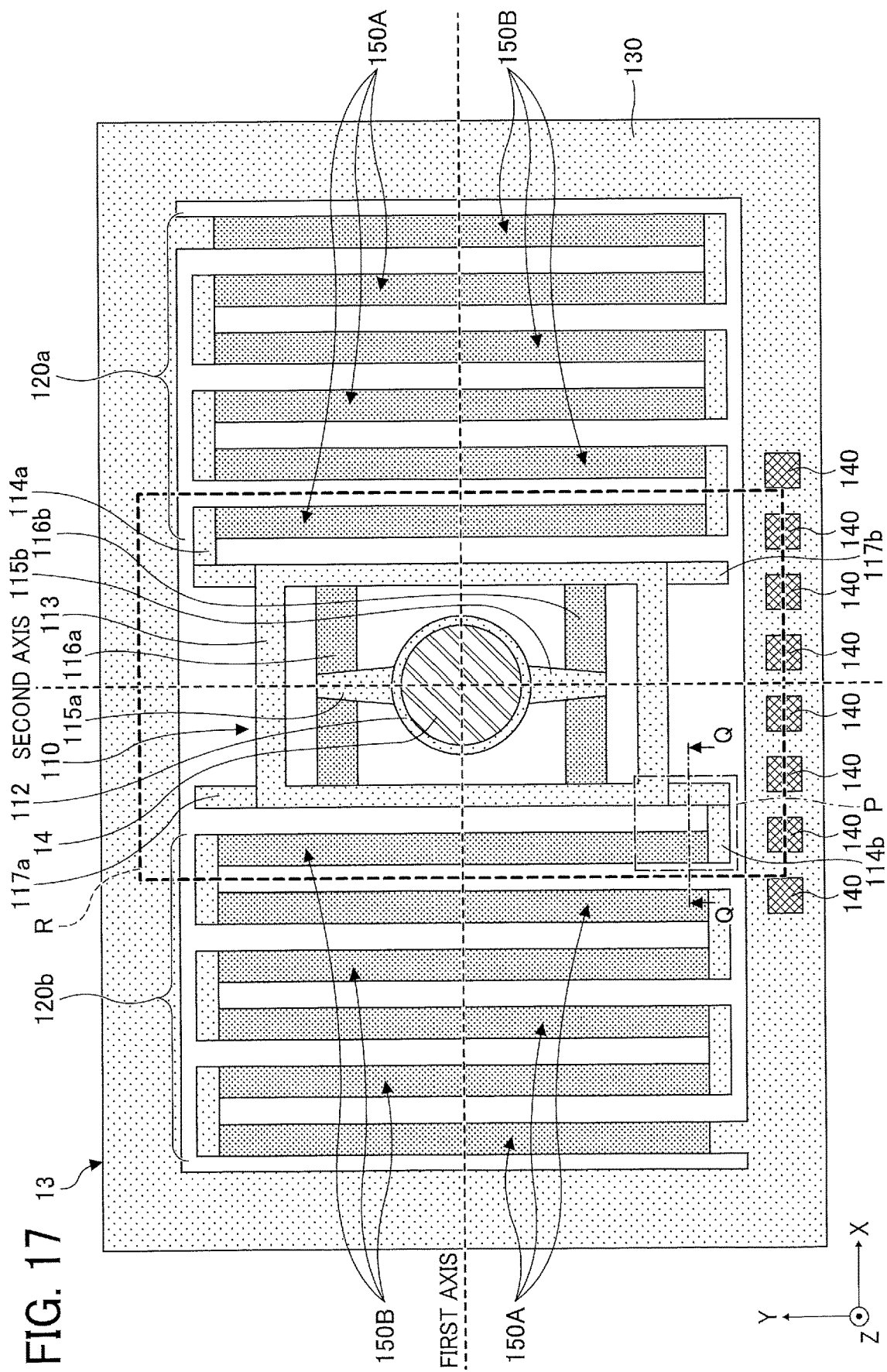
FIG. 17 is a plan view of an example configuration of a movable device according to an embodiment of the present disclosure.

FIG. 17 is a plan view of an example configuration of the movable device 13 according to an embodiment of the present disclosure. The movable device 13 is a double-supported movable device that is rotatable around the first axis and the second axis.

As illustrated in FIG. 17, the movable device 13 includes, for example, the movable section 110, first drive sections 120a and 120b, a first supporting member 130 (a first support), and an electrode terminal 140.

In addition, the movable section 110 includes, for example, a reflector 112 including the reflecting plane 14, a second supporting member 113 (a second support), connecting sections 114a and 114b, torsion bars 115a and 115b, second drive sections 116a and 116b, and adjusters 117a and 117b.

The reflector 112 is formed of, for example, a silicon active layer. However, no limitation is intended therein. Alternatively, the reflector 112 may be formed of an oxidation material, an inorganic material, or an organic material.

The reflecting plane 14 is formed on the +Z-side surface of the reflector 112. The reflecting plane 14 is a circular thin film made of, for example, a metal containing aluminum, gold, silver or the like or a multilayer film thereof.

A rib for reinforcing the reflector 112 may be provided on the −Z-side surface of the reflector 112. In this case, the rib is formed of, for example, a silicon supporting layer and a silicon oxide layer. With the provision of the rib, the deformation of the reflector 112 and the reflecting plane 14 due to the movement of the movable device 13 can be reduced or eliminated.

The torsion bars 115a and 115b extend in the Y direction, are formed such that the reflector 112 is disposed between the torsion bars 115a and 115b in the Y direction. One end of the torsion bar 115a is connected to the reflector 112, and one end of the torsion bar 115b is connected to the reflector 112. The reflector 112 is supported by the torsion bars 115a and 115b.

The other end of the torsion bar 115a is connected to the second drive section 116a, and the other end of the torsion bar 115b is connected to the second drive section 116b. The second drive sections 116a and 116b are provided with a piezoelectric element on the +Z-side surface of the elastic beam. When a drive voltage is applied to the second drive section 116a through the electrical wiring laid out from the electrode terminal 140, the torsion bar 115a deforms and twists. Similarly, when a drive voltage is applied to the second drive section 116b through the electrical wiring laid out from the electrode terminal 140, the torsion bar 115b deforms and twists. Such twisting of the torsion bars 115a and 115b provides rotating force to rotate (oscillate) the reflector 112 around the second axis.

The second supporting member 113 is formed to surround the reflector 112, the torsion bars 115a and 115b, and the second drive sections 116a and 116b. The second supporting member 113 is connected to the second drive sections 116a and 116b to hold and restrain the second drive sections 116a and 116b. The second supporting member 113 indirectly supports the reflector 112 and the torsion bars 115a and 115b using the second drive sections 116a and 116b.

A connecting section 114a is formed at the upper right corner of the second supporting member 113, and the second supporting member 113 is connected to the first drive section 120a via the connecting section 114a. The connecting section 114a extends in the −X direction from a location where the connecting section 114a is connected to the first drive section 120a, and folds in the direction to the second supporting member 113, extending in the −Y direction to connect to the second supporting member 113.

A connecting section 114b is formed at the lower left corner of the second supporting member 113, and the second supporting member 113 is connected to the first drive section 120b via the connecting section 114b. The connecting section 114b extends in the +X direction from a location where the connecting section 114a is connected to the first drive section 120b, and folds in the direction to the second supporting member 113, extending in the +Y direction to connect to the second supporting member 113.

The first drive section 120a and the first drive section 120b support the second supporting member 113 such that the second supporting member 113 is disposed between the first drive sections 120a and 120b.

An adjuster 117a is formed at the upper left corner of the second supporting member 113, and an adjuster 117b is formed at the lower right corner of the second supporting member 113. The adjuster 117a and the adjuster 117b are formed at positions symmetrical with respect to the reflector 112. Further, the adjuster 117a and the adjuster 117b are formed at corners where the connecting sections 114a and 114b of the second supporting member 113 are not formed. The adjusters 117a and 117b are separately described in detail later.

The first drive section 120a has a meandering structure that includes three folded portions and three connecting portions, and has a plurality of elastic beams connected to the folded portions and the connecting portions. Each of the plurality of elastic beams is provided with a piezoelectric element on the +Z-directional surface thereof. The end of the first drive section 120a, which is not connected to the connecting section 114a, is connected to the first supporting member 130. The first supporting member 130 holds and restrains the first drive section 120a.

Same as the first drive section 120a, the first drive section 120b has a meandering structure that includes three folded portions and three connecting portions, and has a plurality of elastic beams connected the folded portions and the connecting portions. Each of the plurality of elastic beams is provided with a piezoelectric element on the +Z-side surface thereof. The end of the first drive section 120b, which is not connected to the connecting section 114b, is connected to the first supporting member 130. The first supporting member 130 holds and restrains the first drive section 120b.

A drive voltage is applied to the piezoelectric elements of the first drive sections 120a and 120b through the electrical wiring laid out starting from the electrode terminal 140.

Further, among the plurality of elastic beams of the first drive section 120a, piezoelectric elements on odd-numbered elastic beams counted from the elastic beam disposed closest to the reflector 112 are referred to as the piezoelectric drive circuit group 150A. Further, among the plurality of elastic beams of the first drive section 120b, piezoelectric elements on even-numbered elastic beams counted from the elastic beam disposed closest to the reflector 112 are referred to as the piezoelectric drive circuit group 150A. The piezoelectric drive circuit group 150A bends and deforms in the same direction when a drive voltage is simultaneously applied to each of the piezoelectric elements. Using this deformation as the rotating force, the movable section 110 rotates on the first axis.

Further, among the plurality of elastic beams of the first drive section 120a, piezoelectric elements on even-numbered elastic beams counted from the elastic beam disposed closest to the reflector 112 are referred to as the piezoelectric drive circuit group 150B. Further, among the plurality of elastic beams of the first drive section 120b, piezoelectric elements on odd-numbered elastic beams counted from the elastic beam disposed closest to the reflector 112 are referred to as the piezoelectric drive circuit group 150B. The piezoelectric drive circuit group 150B bends and deforms in the same direction when a drive voltage is simultaneously applied to each of the piezoelectric elements. Using this deformation as the rotating force, the movable section 110 rotates on the first axis in the opposite direction to the direction of rotation of the piezoelectric drive circuit group 150A.

The first drive sections 120a and 120b simultaneously bend and deform the plurality of piezoelectric elements of the piezoelectric drive circuit groups 150A and 150B so as to accumulate the amount of rotation due to the bending and deforming of the piezoelectric elements, and thus increase the swing angle of the movable section 110 about the first axis. When the amount of rotation of the movable section 110 caused by applying a voltage to the piezoelectric drive circuit group 150A is well balanced with the amount of rotation of the movable section 110 caused by applying a voltage to the piezoelectric drive circuit group 150B, the swing angle becomes zero.

Next, the region P indicated by dot-and-dash lines in FIG. 17 is described in detail with reference to FIGS. 18A and 18B. FIG. 18A is a cross-sectional view taken along the line Q-Q indicated by dot-dot-dash lines in FIG. 17.

In FIG. 18A, each elastic beam 300 of the first drive section 120b includes a silicon active layer 200, a lower electrode 301, a piezoelectric element 302, and an upper electrode 303. On the +Z-side surface of the silicon active layer 200, the lower electrode 301, the piezoelectric element 302, and the upper electrode 303 are sequentially formed in the +Z-direction.

The upper electrode 303 and the lower electrode 301 are made of material such as gold (Au) and platinum (Pt). The tip of at least one of the upper electrode 303 and the lower electrode 301 are an obtuse angle.

The piezoelectric element 302 is made of a material such as lead zirconate titanate (PZT) having piezoelectricity. The plurality of elastic beams of the first drive sections 120a and 120b has the same layer structure as the layer structure of the elastic beam 300 as illustrated in FIG. 18A. The elastic beams of the second drive sections 116a and 116b also have the same layer structure.

In particular, at least one of the upper electrode and the lower electrode has a circular corner or a tapered corner in the area connected to the torsion bar 115a in the second drive section 116a of FIG. 17. More preferably, both the upper electrode and the lower electrode have a similar circular corner or tapered corner. Same as the second drive section 116a, at least one of the upper electrode and the lower electrode has a circular corner or a tapered corner in the area connected to the torsion bar 115b in the second drive section 116b of FIG. 17. More preferably, both the upper electrode and the lower electrode have a similar circular corner or tapered corner.

In the above-described embodiment, the second drive sections 116a and 116b have a double-supported beam structure in which both ends of each of the second drive sections 116a and 116b are connected to the second supporting member 113. However, the second drive sections 116a and 116b may have a cantilever structure. In the cantilever structure, one end of the second drive section 116a is connected to the second supporting member 113, and the other end of the second drive section 116a is connected to the torsion bar 115a. Further, one end of the second drive section 116b is connected to the second supporting member 113, and the other end of the second drive section 116b is connected to the torsion bar 115b.

In the case of the cantilever structure, at least one of the upper electrode and the lower electrode of each of the second drive sections 116a and 116b has a circular corner or a tapered corner in the end connected to the torsion bar. More preferably, both the upper electrode and the lower electrode have a similar circular corner or tapered corner.

In FIG. 18A, the piezoelectric element 302 is electrically connected to an external control device through the electrical wiring laid out from the electrode terminal 140, and is driven when a drive voltage is applied to the piezoelectric element 302. Alternatively, the first drive sections 120a and 120b may be covered with an insulating layer such as silicon dioxide (SiO2), and electrical wiring may be formed on the +Z-side surface of the insulating layer.

The connecting section 114b includes a silicon active layer 200, an interlayer film 201, and a silicon supporting layer 202. The interlayer film 201 and the silicon supporting layer 202 are sequentially formed in the −Z-side surface of the silicon active layer 200. The interlayer film 201 is made of material such as silicon monoxide (SiO), and the silicon supporting layer 202 is made of, for example, single crystal silicon. An insulating film or electrical wiring may be formed on the +Z-side surface of the connecting section 114b.

Figure 18B:
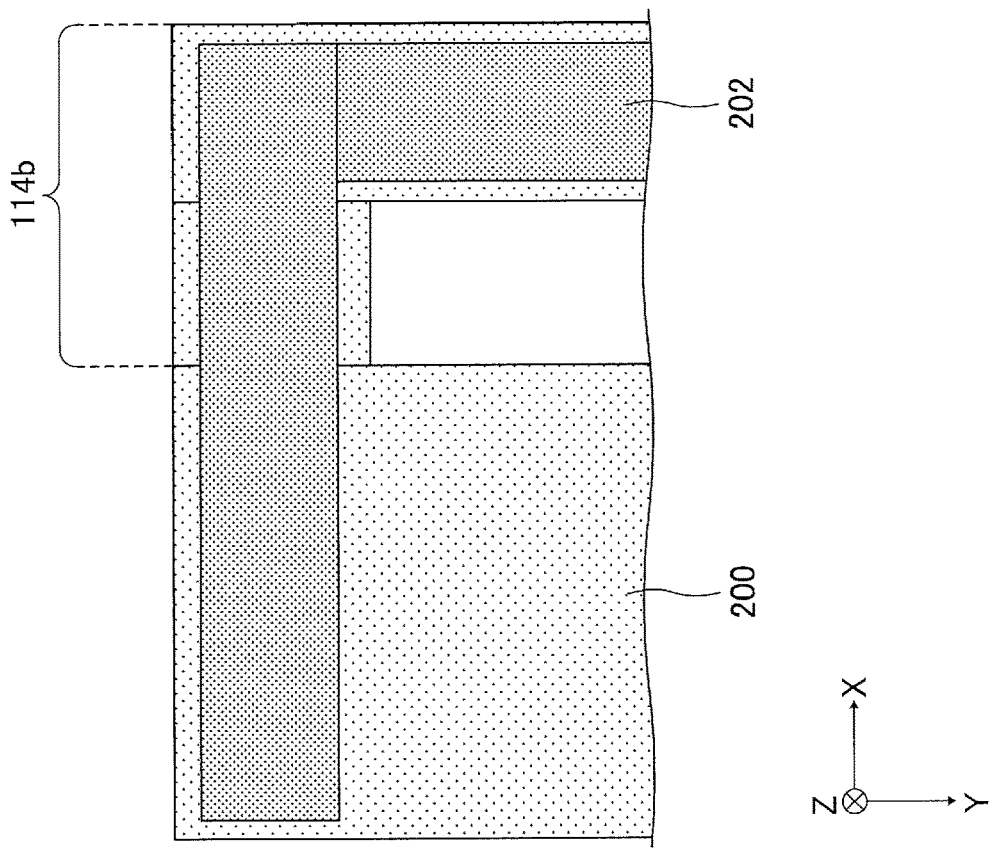
FIGS. 18A and 18B (FIG. 18) are cross-sectional views of a part of the example configuration in FIG. 17.
Figure 18A:
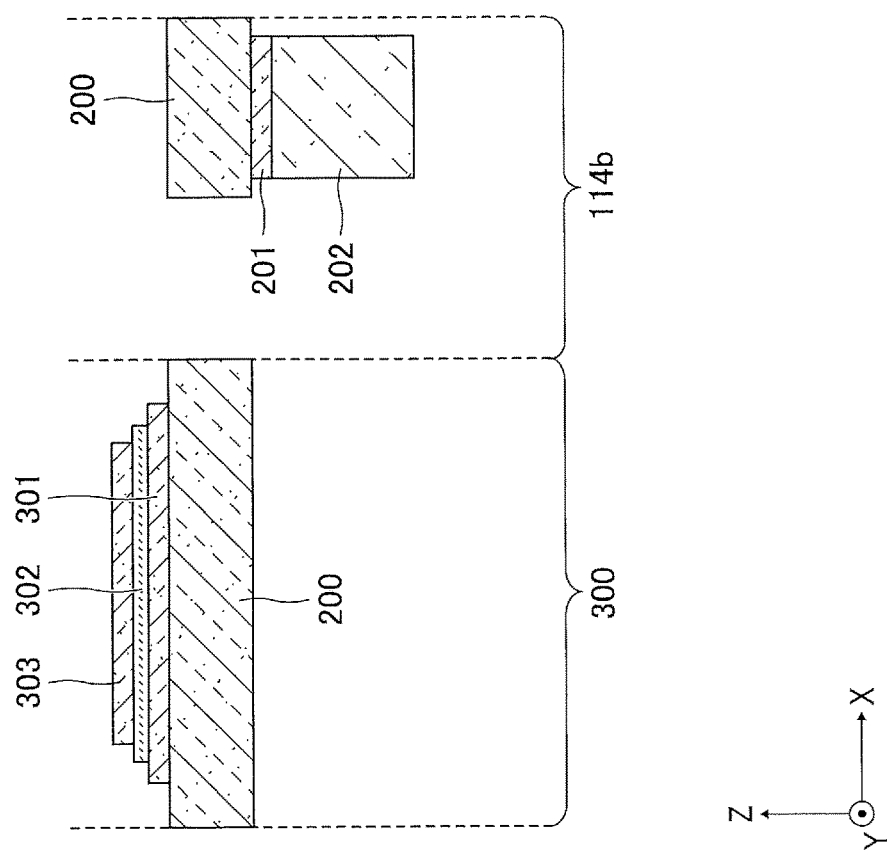

FIG. 18B is a rear view of the region P indicated by dot-and-dash line in FIG. 17. The silicon supporting layer 202 is formed and disposed on the −Z-side surface of the silicon active layer 200. In the connecting section 114b, the silicon supporting layer 202 may be formed to reach the elastic beam 300 of the first drive section 120b.

Next, the adjusters 117a and 117b are described. As described above, the adjusters 117a and 117b are formed at the corners where the connecting sections 114a and 114b are not formed in the second supporting member 113, and are arranged at symmetrical positions with respect to the reflector 112. The adjusters 117a and 117b have the same layer structure as the structure of the connecting section 114b as illustrated in FIG. 18A.

Figure 19A:
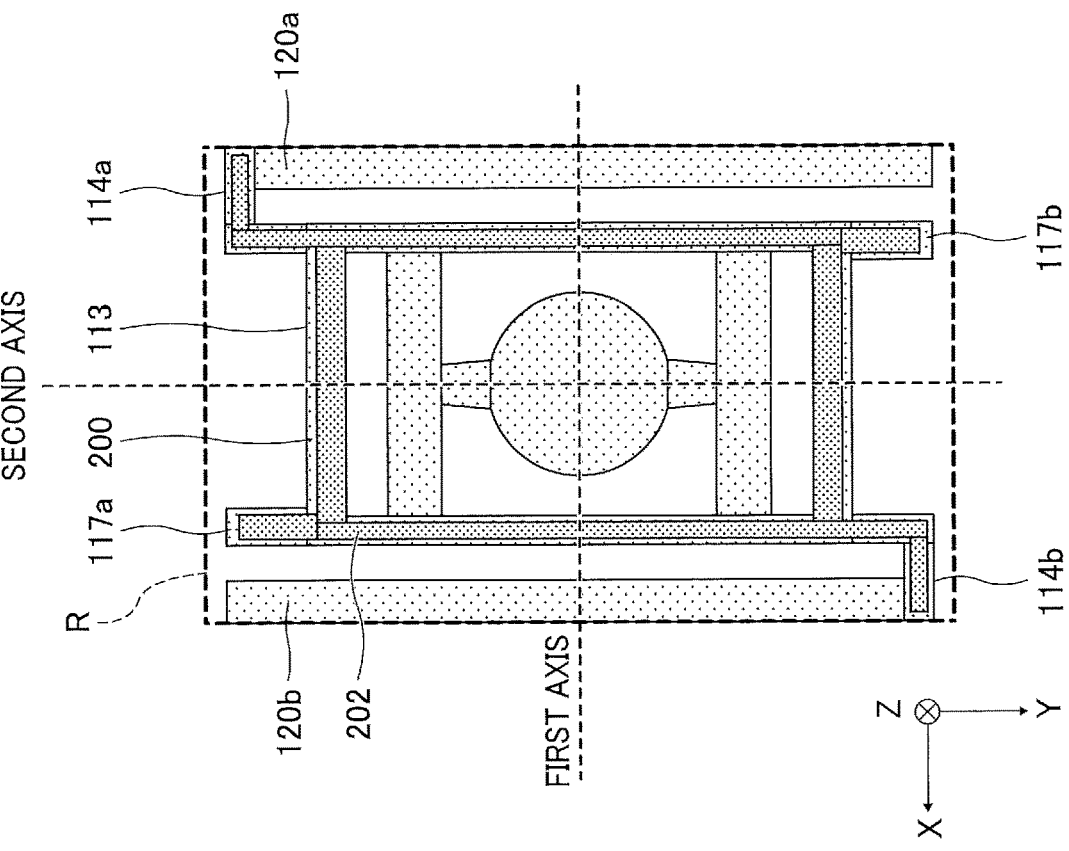
FIGS. 19A and 19B (FIG. 19) are rear views of a part of the example configuration in FIG. 17.
Figure 19B:
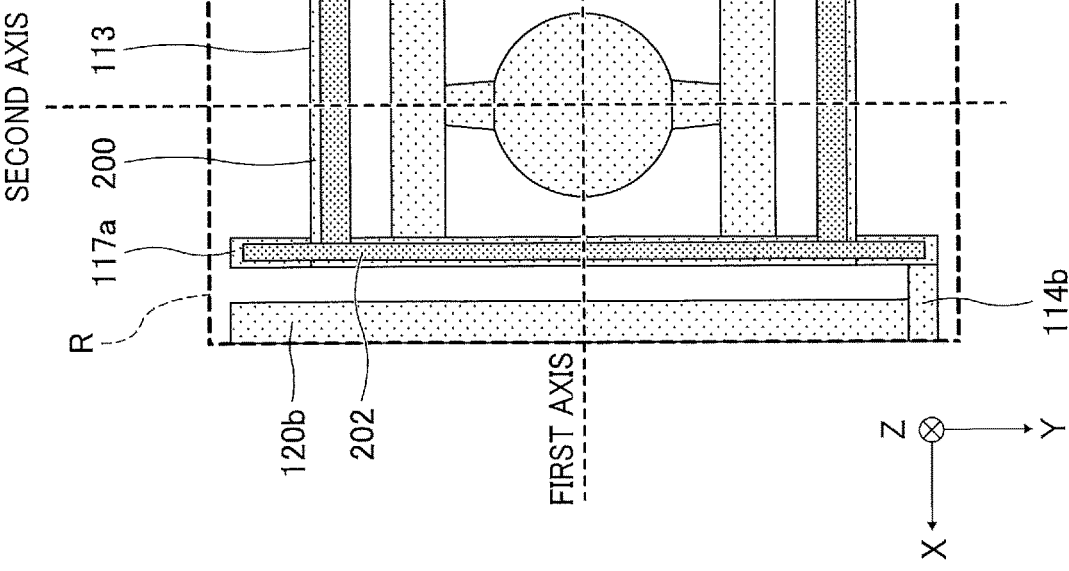

FIGS. 19A and 19B are rear views of a region R indicated by a broken line in FIG. 17.

In the rear views of FIGS. 19A and 19B, for example, the connecting section 114a is illustrated at the same position as in FIG. 17.

FIGS. 19A and 19B are also illustrations of the silicon supporting layer 202 of the second supporting member 113 formed and disposed on the −Z-side surface of the silicon active layer 200.

FIG. 19A is an illustration of a first example arrangement of the silicon supporting layer 202.

In FIG. 19A, the silicon supporting layer 202 is provided on the back side of the second supporting member 113. The silicon supporting layers 202 are provided on the back side of the portions of the connecting sections 114a and 114b extending in the Y direction. The silicon supporting layer 202 is provided on the back side of the adjusters 117a and 117b. By forming the adjusters 117a and 117b on the second supporting member 113, the silicon supporting layers 202 are symmetrically disposed with respect to the second axis. With such an arrangement, the symmetry of the weight of the movable section 110 can be obtained with respect to the reflector 112.

For example, when each of the first drive sections 120a and 120b is connected only to a part of the movable section 110, the symmetry of the weight of the movable section 110 with respective to the reflector 112 might be broken due to the weight at positions where the first drive sections 120a and 120b are connected to the movable section 110. When the symmetry of the weight is broken, the position of the center of gravity of the movable section 110 is shifted, and the rotation of the movable section 110 about the first axis and the second axis becomes unstable.

As illustrated in FIG. 19A, the symmetry of weight of the movable section 110 is obtained by providing the adjusters 117a and 117b so as to prevent the shift of the center of gravity of the movable section 110. Accordingly, the movable section 110 can stably rotate (oscillate).

FIG. 19B is an illustration of a second example arrangement of the silicon supporting layer 202.

In FIG. 19B, the silicon supporting layer 202 is provided on the back side of the second supporting member 113. The silicon supporting layers 202 are provided on the back side of the portions of the connecting sections 114a and 114b extending in the X direction and the Y direction. The silicon supporting layer 202 is provided on the back side of the adjusters 117a and 117b. In the connecting sections 114a and 114b, the silicon supporting layer 202 is also provided at the portion extending in the X direction, which increases the weight of the movable section 110.

For this reason, the width (the length in the X direction) of the silicon supporting layer 202 provided on the adjusters 117a and 117b is made thicker than the width of the silicon supporting layer 202 provided on the connecting sections 114a and 114b. Accordingly, the symmetry of weight of the movable section 110 with respect to the reflector 112 can be obtained.

In such a manner, the widths, lengths, and thicknesses of the adjusters 117a and 117b, and the silicon supporting layer 202 provided on the adjusters 117a and 117b are adjusted so as to obtain the symmetry of weight of the movable section 110 with respect to the reflector 112. Accordingly, the movable section 110 can stably rotate around the first axis and the second axis.

The appropriate values are obtained in advance for the width, length, and thickness of the adjusters 117a and 117b, and the width, length, and thickness of the silicon supporting layer 202 provided on the adjusters 117a and 117b through experiment or simulation to obtain the symmetry of weight of the movable section 110.

The weight may be adjusted by changing not only the dimensions such as the width, the length, and the thickness but also the materials of the adjusters 117a and 117b and the layers provided on the adjusters 117a and 117b. The thickness may be partially increased to change the thickness.

For example, with a decrease in the distance to the reflector 112, the thicknesses of the adjusters 117a and 117b and the layers on the adjusters 117a and 117b may be gradually increased or reduced. With such a configuration, a flexible adjustment method is performed according to the shape or structure of the movable device 13, so as to obtain the symmetry of weight of the movable section 110.

For example, the substrate of the movable device 13 may be a semiconductor such as a silicon on insulator (SOI). The components such as the adjusters 117a and 117b are produced as a single unit by processing through the semiconductor process.

Note that the first drive sections 120a and 120b and the second drive sections 116a and 116b may be formed after formation of the SOI substrate or during the formation of the SOI substrate.

The dimensions such as the width and length of the adjusters 117a and 117b can be changed in a post process after the movable device 13 is manufactured. In such a case, the center-of-gravity position etc. of the movable section 110 can be adjusted by post processing, and a flexible adjustment can be made to allow the movable section 110 to stably rotate.

Although the example in which the piezoelectric element is formed on the +Z-side (directional) surface of the silicon active layer 200 has been described above, the piezoelectric element may be provided on the −Z-side (directional) surface of the silicon active layer 200. Alternatively, the piezoelectric element may be provided on both sides of the silicon active layer 200.

The shape of each component is not limited to the shape described in the present embodiments as long as the reflector 112 is rotatable around the first axis or the second axis.

For example, the torsion bars 115a and 115b, the first drive sections 120a and 120b, and the second drive sections 116a and 116b may have a shape having a curvature instead of a planar shape.

Next, an example method of driving the movable device 13 is described with reference to FIG. 17. A drive voltage is applied to the second drive sections 116a and 116b at the resonance frequency of the single unit constituted by the reflector 112, the torsion bars 115a and 115b, and the second drive sections 116a and 116b so as to rotate the reflector 112. The resonant frequency is, for example, 20 kHz.

The piezoelectric element 302 of the second drive section 116a connected to one end of the torsion bar 115a deforms when a drive voltage is applied to the piezoelectric element 302 through the upper electrode 303 and the lower electrode 301. Deforming of the piezoelectric element 302 causes the second drive section 116a to be bent and deformed, and the torsion bar 115a to be twisted.

The piezoelectric element 302 of the second drive section 116b connected to one end of the torsion bar 115b deforms when a drive voltage is applied to the piezoelectric element 302 through the upper electrode 303 and the lower electrode 301. The deforming of the piezoelectric element 302 causes the second drive section 116b to be bent and deformed, and the torsion bar 115b to be twisted.

The twisting of the torsion bars 115a and 115b provides a rotating force to cause the reflector 112 to swing (rotates back and forth) about the second axis. The waveform of the drive voltage applied to the second drive sections 116a and 116b is, for example, a sine wave. In this case, the reflector 112 is resonantly driven in a cycle of a drive voltage waveform of a sine wave, and rotates back and forth (swings).

In the rotation (oscillation) around the first axis, the waveform of the drive voltage applied to the piezoelectric drive circuit group 150A includes, for example, a sawtooth waveform.

The frequency of the drive voltage is, for example, 60 Hz. The waveform of the drive voltage has, for example, a preset ratio Tr:Tf=9:1 where Tr denotes a time width of a rise time in which the voltage value increases from the minimum value to the next maximum value and Tf denotes a time width of a fall time in which the voltage decreases from the maximum value to the next minimum value. In this configuration, the ratio of Tr to one cycle is referred to as a symmetry of the drive voltage B.

Similarly, the waveform of the drive voltage applied to the piezoelectric drive circuit group 150B includes, for example, a sawtooth waveform. The frequency of the drive voltage is, for example, 60 Hz. For the waveform of the drive voltage, for example, a ratio of Tf:Tr=9:1 is set in advance.

The cycle of the waveform of the drive voltage applied to the piezoelectric drive circuit group 150A and the cycle of the waveform of the drive voltage applied to the piezoelectric drive circuit group 150B are set to be the same.

The sawtooth waveforms of the drive voltages are generated by superimposing multiple sine waves on top of one another. According to the above-described embodiment, the waveform of the drive voltage is a sawtooth wave-like waveform. However, no limitation is intended thereby.

The waveform is variable according to the device characteristics of the movable device. Examples of the waveform of the drive voltage includes a waveform in which the top of a sawtooth waveform is rounded and a waveform in which a straight region of a sawtooth waveform is a curve.

The operation of the first drive sections 120a and 120b when the drive voltage is applied thereto is as described above, and the movable section 110 swings about the first axis due to the bending deformation of the piezoelectric drive circuit groups 150A and 150B.

The rotation around the first axis and the rotation around the second axis are examples of the "drive" described in the claims.

As described above, according to the embodiments of the present disclosure, the symmetry of the weight of the movable section 110 can be obtained by providing the adjusters 117a and 117b on the movable device 13. Accordingly, the shift of the center of gravity of the movable section 110 can be prevented and a stable drive, such as rotation, of the movable section 110 can be achieved.

Next, a movable device according to another embodiment is described with reference to FIG. 20. In the present embodiment, the description of the same components as those of the embodiments described above is omitted.

Figure 20:
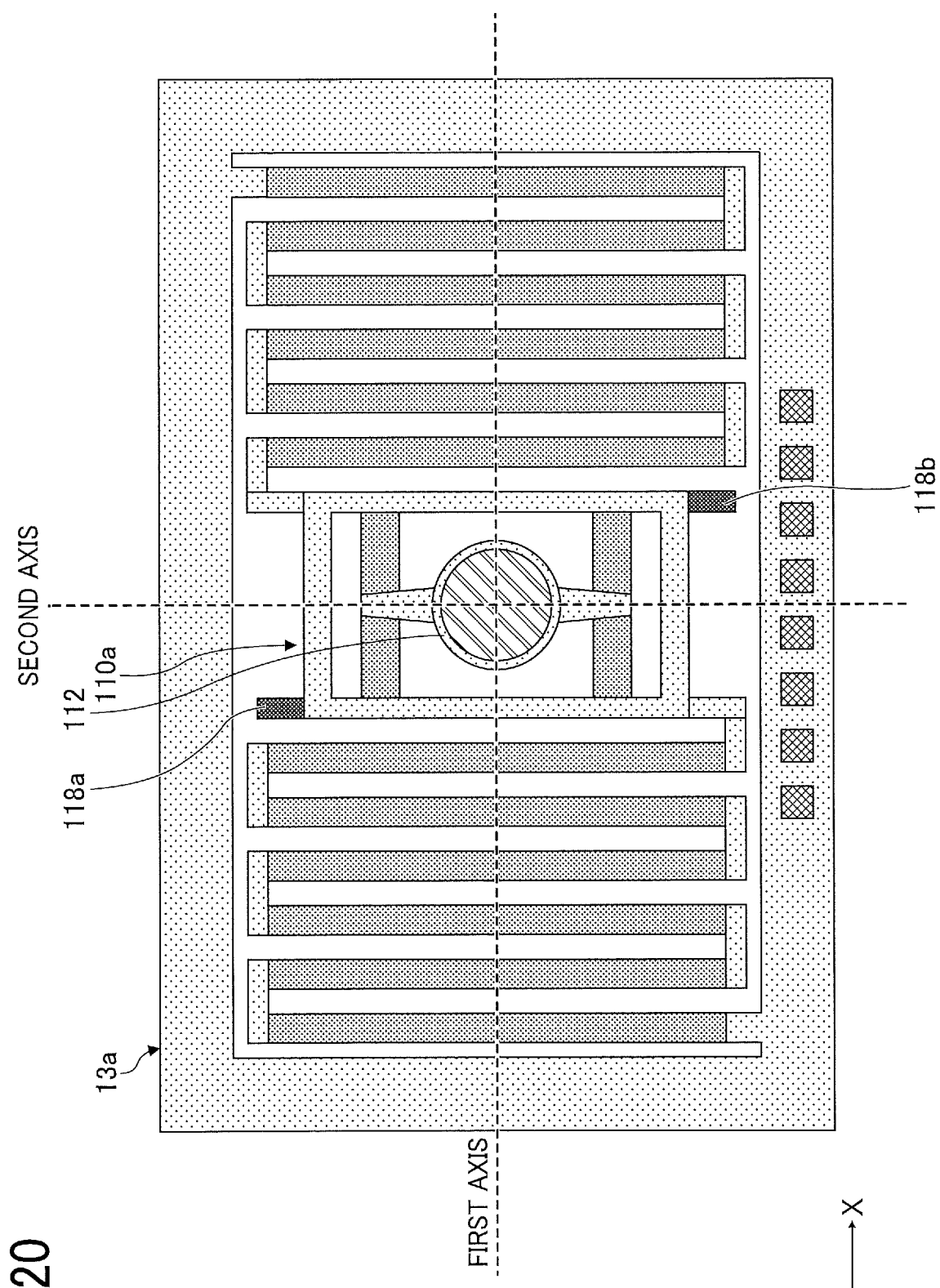
FIG. 20 is a plan view of an example configuration of a movable device according to another embodiment of the present disclosure.

FIG. 20 is a plan view of an example configuration of the movable device 13a according to the present embodiment. The movable device 13a includes a movable section 110a provided with adjusters 118a and 118b. The adjusters 118a and 118b are each formed of only the silicon supporting layer 202.

By adjusting the width, length, and thickness of the silicon supporting layer 202, the symmetry of the weight of the movable section 110a with respect to the reflector 112 is obtained. The appropriate values are obtained in advance for the width, length, and thickness of adjusters 118a and 118b through experiment or simulation to obtain the symmetry of weight of the movable section 110.

Although the example in which the adjusters 118a and 118b are formed only of the silicon supporting layer 202 is described above, the adjusters 118a and 118b may be formed only of the silicon active layer 200.

The other effects are the same as those described in the embodiments described above.

Next, the movable device according to still another embodiment is described with reference to FIG. 21. In the present embodiment, the description of the same components as those of the embodiments described above is omitted.

Figure 21:
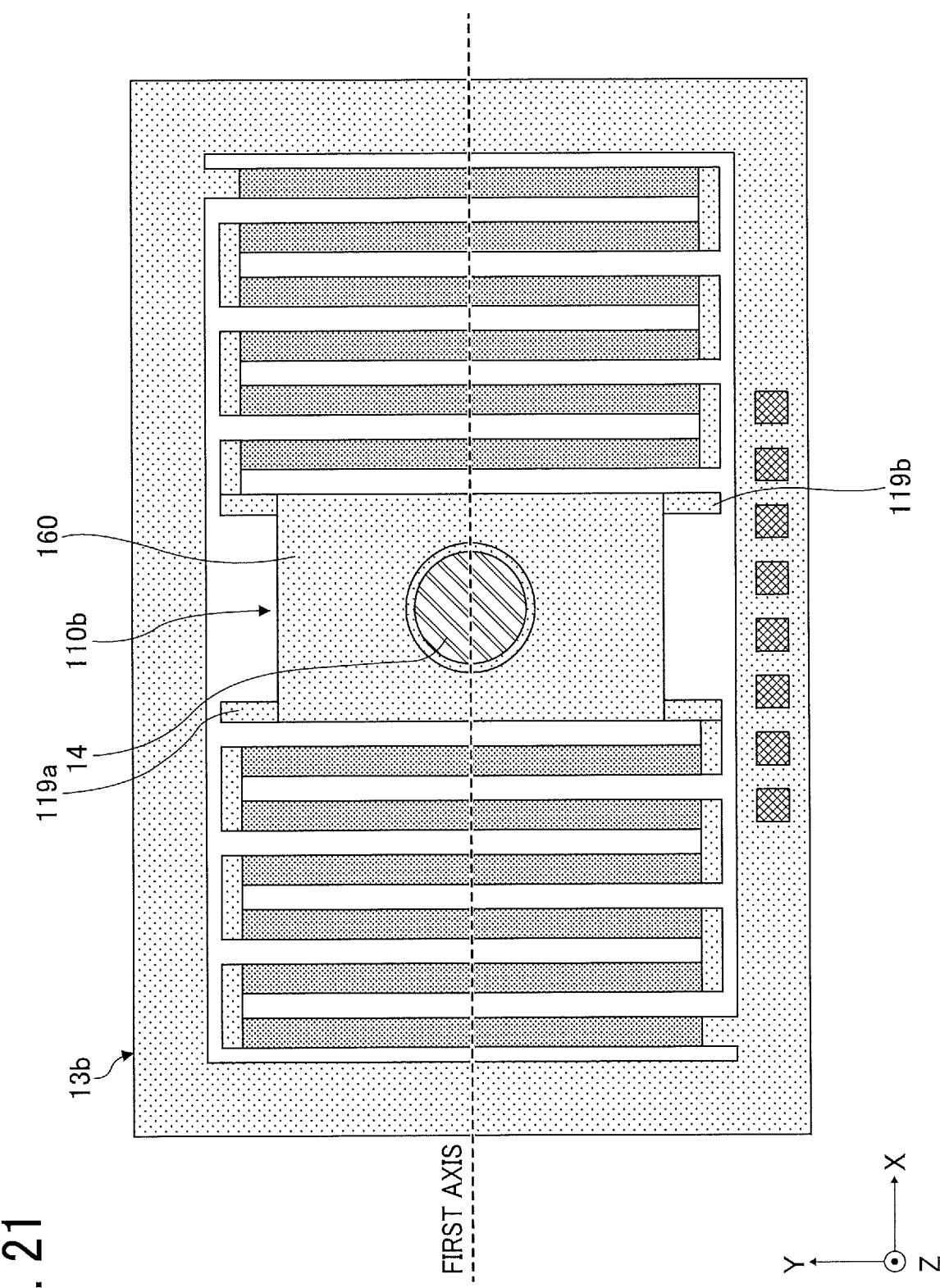
FIG. 21 is a plan view of an example configuration of a movable device according to still another embodiment of the present disclosure.

FIG. 21 is an illustration of an example configuration of a single-axis movable device 13b. The movable device 13b has a movable section 110b that includes a second supporting member 160, and adjusters 119a and 119b. The second supporting member 160 includes a reflecting plane 14. The movable section 110b is rotatable around the first axis.

The adjusters 119a and 119b are each formed of only the silicon active layer 200. By adjusting the width, length, and thickness of the silicon active layer 200, the symmetry of the weight of the movable section 110a is obtained. Although the example in which the adjusters 119a and 119b are formed only of the silicon active layer 200 is described above, the adjusters 119a and 119b may be formed only of the silicon supporting layer or may be formed of the silicon active layer and the silicon supporting layer.

According to the present embodiment, the symmetry of the weight of the movable section 110b is obtained by providing the adjusters 119a and 119b in the single-axis movable device 13b. Accordingly, the shift of the center of gravity position can be prevented, and a stable drive, such as rotation, of the movable section 110b can be achieved.

The other effects are the same as those described in the embodiments except for the effects limited to the two-axis movable device.

Although the embodiments of the present disclosure have been described above, the present disclosure is not limited to such specific embodiments, and various other embodiments may be used without departing from the spirit and scope of the present disclosure as set forth in the appended claims.

Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. A movable device comprising:
    a movable section including a reflector;
    a first drive section, connected to the movable section, and configured to drive the movable section;
    a first support, connected to the first drive section, and configured to support the first drive section; and
    two adjusters, disposed symmetrically on the movable section with respect to the reflector, and configured to adjust a position of a center of gravity of the movable section, so as to provide both a point symmetry and a line symmetry of a weight of the movable section with respect to the reflector.

2. The movable device according to claim 1, wherein at least one of a width, a length, and a thickness of each of the two adjusters is set in advance in accordance with the position to which the center of gravity of the movable section is adjusted.

3. The movable device according to claim 1, wherein the movable section further includes
    a second support connected to the first drive section, and
    a second drive section, supported by the second support and connected to the reflector, and configured to drive the reflector.

4. The movable device according to claim 3, wherein the two adjusters are disposed on the second support, and respectively have a projecting shape.

5. The movable device according to claim 3, wherein the second drive section is configured to resonantly drive the reflector.

6. The movable device according to claim 3,
    wherein the first drive section is configured to oscillate the movable section about a first axis,
    wherein the second drive section is configured to oscillate the reflector about a second axis that is perpendicular to the first axis, and
    wherein the center of gravity of the movable section is positioned on at least one of the first axis and the second axis.

7. The movable device according to claim 3, wherein at least one of a width, a length, and a thickness of each of the two adjusters is adjustable so that the center of gravity of the movable section is adjustable to a position located on an axis of rotation of the movable section driven by the first drive section.

8. The movable device according to claim 3, further comprising:
    a connecting section configured to connect the second support and the first drive section, and
    wherein the connecting section has a laminated structure including a silicon active layer, an interlayer film, and a silicon supporting layer that are laminated.

9. The movable device according to claim 8, wherein each of the two adjusters is formed solely by the silicon supporting layer.

10. The movable device according to claim 8, wherein each of the two adjusters is formed solely by the silicon active layer.

11. The movable device according to claim 8, wherein each of the two adjusters is formed by the same laminated structure as the connecting section.

12. The movable device according to claim 1, wherein the first drive section has a meandering, structure that includes two or more folded portions and two or more connecting portions.

13. The movable device according to claim 1, wherein at least one of a width, a length, and a thickness of each of the two adjusters is adjustable so that the center of gravity of the movable section is adjustable to a position located on an axis of rotation of the movable section driven by the first drive section.

14. The movable device according to claim 1, wherein the movable section further includes
a second support connected to the first drive section, and
a second drive section, supported by the second support and connected to the reflector, and configured to drive the reflector,
wherein the first drive section includes a pair of drive sections respectively connected to the second support at a pair of first symmetrical positions located on a first diagonal line that passes through the center of gravity of the movable section,
wherein the two adjusters are respectively connected to the second support at a pair of second symmetrical positions located on a second diagonal line that is different from the first diagonal line and passes through the center of gravity of the movable section, and
wherein the pair of first symmetrical positions and the pair of second symmetrical positions are mutually different positions that are symmetrical with respect to the center of gravity of the movable section.

15. The movable device according to claim 1, wherein the two adjusters are disposed on the movable section, and respectively have a projecting or protruding shape.

16. An apparatus comprising:
a light source configured to emit a laser beam; and
a movable device including
a movable section including a reflector,
a drive section, connected to the movable section, and configured to drive the movable section,
a support, connected to the drive section, and configured to support the drive section, and
two adjusters, disposed symmetrically on the movable section with respect to the reflector, and configured to adjust a position of a center of gravity of the movable section, so as to provide both a point symmetry and a line symmetry of a weight of the movable section with respect to the reflector,
wherein the movable device is configured to deflect the laser beam by the reflector.

17. The apparatus as claimed in claim 16, further comprising:
a controller configured to control the light source, and the drive section that drives the movable section.

18. The apparatus as claimed in claim 17, further comprising:
a projection optical system including an intermediate screen and a projection mirror,
wherein the movable device deflects the laser beam under control of the controller to perform a two-dimensional scan and display an intermediate image on the intermediate screen, and
wherein the projection mirror projects the intermediate image onto a windshield of a vehicle, as a virtual image.

19. The apparatus as claimed in claim 17, further comprising:
a mirror; and
a transparent plate including a fluorescent material coating,
wherein the movable device deflects the laser beam under control of the controller to perform a two-dimensional scan and strike the transparent plate via the mirror, thereby providing illumination by the laser beam scattered by the fluorescent material coating of the transparent plate.

20. The apparatus as claimed in claim 17, further comprising:
a light guide; and
a half mirror,
wherein the movable device deflects the laser beam under control of the controller to perform a two-dimensional scan and strike the light guide that guides the laser beam to the half mirror, and
wherein the half mirror reflects the laser beam from the light guide to one side of the apparatus, and emits the laser beam in a direction of eyes of a wearer who wears the apparatus, thereby forming an image on a retina of the eyes.

21. The apparatus as claimed in claim 17, wherein the movable device deflects the laser beam under control of the controller to perform a two-dimensional scan and optically scan a target surface.

22. A movable device comprising:
a movable section including a reflector;
a drive section, connected to the movable section, and configured to drive the movable section;
a support, connected to the drive section, and configured to support the drive section; and
two adjusters, disposed symmetrically on the movable section with respect to the reflector, and configured to adjust a position of a center of gravity of the movable section, so as to provide symmetry of a weight of the movable section with respect to the reflector.

* * * * *